(12) United States Patent
Conrad

(10) Patent No.: US 11,457,569 B2
(45) Date of Patent: Oct. 4, 2022

(54) MODULAR LIGHTING SYSTEM, SUCH AS FOR AN INDOOR CULTIVATION FACILITY

(71) Applicant: OMACHRON INTELLECTUAL PROPERTY INC., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

(21) Appl. No.: 17/207,570

(22) Filed: Mar. 19, 2021

(65) Prior Publication Data

US 2021/0204486 A1  Jul. 8, 2021

Related U.S. Application Data

(63) Continuation of application No. 16/788,470, filed on Feb. 12, 2020, now Pat. No. 10,980,187.

(60) Provisional application No. 62/808,510, filed on Feb. 21, 2019.

(51) Int. Cl.
| | |
|---|---|
| *A01G 7/04* | (2006.01) |
| *F21S 8/06* | (2006.01) |
| *F21V 29/76* | (2015.01) |
| *F21V 21/15* | (2006.01) |
| *F21S 2/00* | (2016.01) |
| *F21Y 103/10* | (2016.01) |
| *F21Y 115/10* | (2016.01) |

(52) U.S. Cl.
CPC .............. *A01G 7/045* (2013.01); *F21S 2/005* (2013.01); *F21S 8/06* (2013.01); *F21V 21/15* (2013.01); *F21V 29/767* (2015.01); *F21Y 2103/10* (2016.08); *F21Y 2115/10* (2016.08)

(58) Field of Classification Search
CPC ...... F21S 2/005; F21S 4/28; F21S 8/06; F21S 2/00; F21V 21/005; F21V 21/15; F21V 29/767; F21V 21/38; F21V 23/06; F21Y 2103/10; F21Y 2115/10; F21Y 2105/10; A01G 7/045; A01G 9/249
See application file for complete search history.

(56) References Cited

U.S. PATENT DOCUMENTS

| | | |
|---|---|---|
| 6,312,139 B1 | 11/2001 | Baker et al. |
| 6,701,694 B2 | 3/2004 | Hppi et al. |
| 8,523,385 B2 | 9/2013 | Lu et al. |
| 10,292,340 B2 | 5/2019 | Berinsky |
| 10,398,090 B2 | 9/2019 | Adams et al. |

(Continued)

FOREIGN PATENT DOCUMENTS

| | | | |
|---|---|---|---|
| KR | 101268566 B1 | 5/2013 | |
| RU | 2490868 C2 | 8/2013 | |
| WO | WO 2007/069130 | * 6/2007 | ................ F21S 2/00 |

OTHER PUBLICATIONS

Philips product sheet: "The efficient way to improve climate and crop control", dated at least as early as May 2018.

(Continued)

*Primary Examiner* — Peggy A Neils
(74) *Attorney, Agent, or Firm* — Philip C. Mendes da Costa; Bereskin & Parr LLP/S.E.N.C.R.L., s.r.l.

(57) ABSTRACT

A lighting system, such as for an indoor growing facility, comprises a plurality of lighting units, each lighting unit comprising at least one LED, wherein each lighting unit is powered by a power supply and wherein the plurality of lighting units are arrayed linearly.

19 Claims, 18 Drawing Sheets

(56) References Cited

U.S. PATENT DOCUMENTS

| | | |
|---|---|---|
| 10,433,493 B2 | 10/2019 | Barber, III et al. |
| 10,798,878 B2 | 10/2020 | Nicole et al. |
| 2007/0058368 A1 | 3/2007 | Partee et al. |
| 2012/0007516 A1* | 1/2012 | Lax .......................... F21S 2/00 |
| | | 315/201 |
| 2012/0043907 A1 | 2/2012 | Lu et al. |
| 2012/0235579 A1* | 9/2012 | Chemel .................. F21S 2/005 |
| | | 315/152 |
| 2013/0258684 A1 | 10/2013 | Yang et al. |
| 2014/0022517 A1* | 1/2014 | Villeflose ........... G03B 21/2053 |
| | | 353/85 |
| 2014/0140056 A1 | 5/2014 | Morgan et al. |
| 2015/0089867 A1 | 4/2015 | Abbott et al. |
| 2015/0159848 A1* | 6/2015 | Sieberth ................ F21V 21/005 |
| | | 362/311.02 |
| 2015/0223402 A1 | 8/2015 | Krijn et al. |
| 2015/0230409 A1 | 8/2015 | Nicole et al. |
| 2015/0305252 A1 | 10/2015 | Klase et al. |
| 2015/0313090 A1 | 11/2015 | Weiss et al. |
| 2015/0351325 A1 | 12/2015 | Shelor et al. |
| 2016/0262313 A1* | 9/2016 | Szeto .................... A01M 29/10 |
| 2019/0259108 A1 | 8/2019 | Bongartz et al. |
| 2019/0261574 A1 | 8/2019 | Tomasovics |
| 2019/0327908 A1 | 10/2019 | Goettle et al. |

OTHER PUBLICATIONS

English machine translation of KR101268566, published on May 22, 2013.
English machine translation of RU2490868, published on Aug. 27, 2013.

* cited by examiner

MODULAR LIGHTING SYSTEM, SUCH AS FOR AN INDOOR CULTIVATION FACILITY

CROSS-REFERENCE TO RELATED APPLICATIONS

This application is a continuation of U.S. patent application Ser. No. 16/788,470, filed on Feb. 12, 2020, now allowed, which itself claims priority from U.S. Provisional Patent Application No. 62/808,510, filed on Feb. 21, 2019, the content of which is incorporated herein by reference.

FIELD

This disclosure relates generally to lighting systems, and in particular lighting systems for indoor cultivation facilities.

INTRODUCTION

The following is not an admission that anything discussed below is part of the prior art or part of the common general knowledge of a person skilled in the art.

Indoor cultivation facilities provide greater control over the environment in which plants are grown. These facilities also allow growers to extend the growing season for different plants and avoid damage that may be caused due to inclement weather.

An important aspect of indoor cultivation is control over the light directed onto the plants being grown. Lighting systems allow cultivators to provide consistent lighting conditions throughout the growing season without concerns about cloud cover. However, it is important to control the intensity of light projected onto different plants within the facility, even as those plants grow.

Lighting systems also pose additional challenges for indoor cultivation facilities. Installing and maintaining the lighting systems can be a complex and expensive undertaking. Furthermore, the power requirements of the lighting system can be costly.

BRIEF DESCRIPTION OF THE DRAWINGS

For a better understanding of the described embodiments and to show more clearly how they may be carried into effect, reference will now be made, by way of example, to the accompanying drawings in which.

Figure 1:
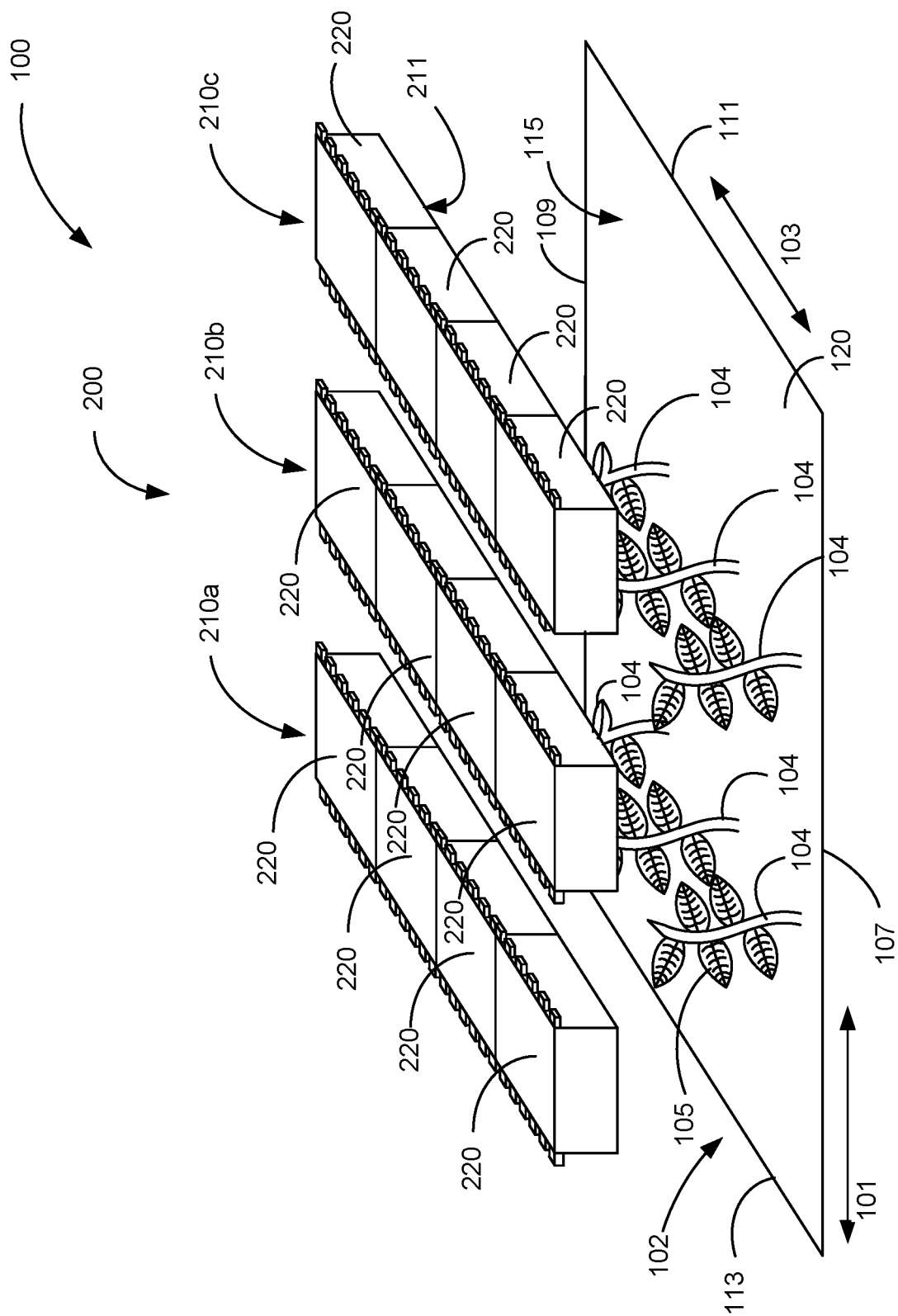
FIG. 1 is a perspective view of an indoor cultivation facility in accordance with an embodiment.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various systems, apparatuses, and methods are described below to provide an example of an embodiment of each claimed invention. No embodiment described below limits any claimed invention and any claimed invention may cover apparatuses and methods that differ from those described below. The claimed inventions are not limited to systems, apparatuses, and methods having all of the features of any one system, apparatus, or method described below or to features common to multiple or all of the systems, apparatuses, and methods described below. It is possible that a system, apparatus, or method described below is not an embodiment of any claimed invention. Any invention disclosed in a system, apparatus, or method described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

Indoor Cultivation Facility

Figure 2:
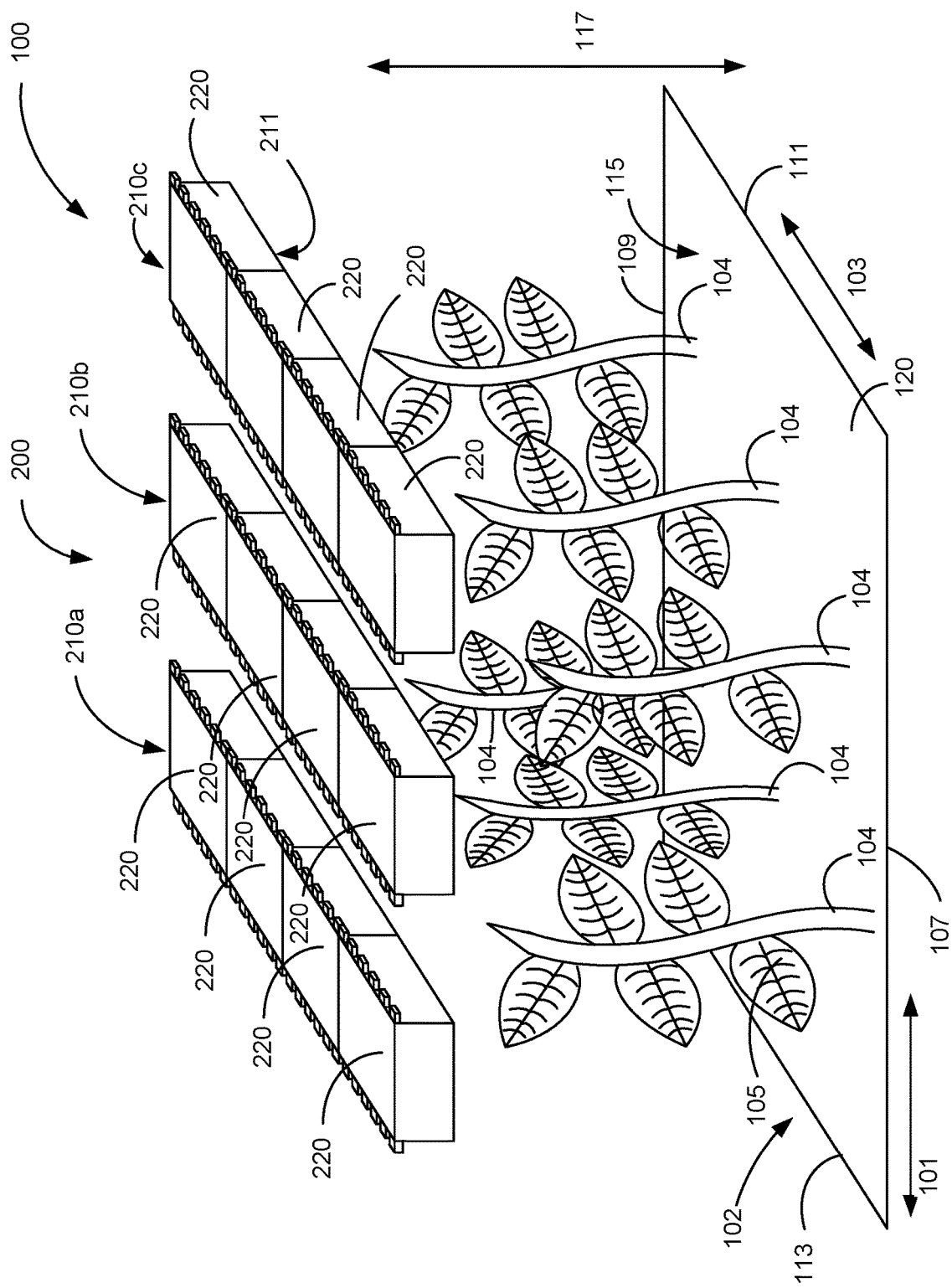
FIG. 2 is a perspective view of the indoor cultivation facility of FIG. 1 following plant growth in accordance with an embodiment.

Referring to FIGS. 1 and 2, exemplary embodiments of an indoor cultivation facility are shown generally as 100. The following is a general discussion of indoor cultivation facility 100 which provides a basis for understanding several of the features which are discussed herein. As discussed subsequently, each of the features may be used individually or in any particular combination or sub-combination in this or in other embodiments disclosed herein.

The facility 100 is an example of an indoor cultivation facility that may be used to cultivate plants 104. Various types of plants 104 may be cultivated within facility 100, such as cannabis plants. The facility 100 may include various environmental control components such as temperature and humidity control components. The facility 100 can also include various environmental monitoring sensors and systems that provide feedback and assist in controlling the environmental conditions within facility 100. The facility 100 may also include passive environmental control components that assist in maintaining desired environmental conditions within the facility 100 such as insulating elements.

The facility 100 can include a growing area 102 within which plants can be positioned. As shown, the growing area 102 has a first end 107, a second end 109, and opposed lateral sides 111 and 113. The growing area 102 extends between the first end 107 and a second end 109 in a longitudinal direction 103 and between the lateral sides 111 and 113 in a lateral direction 101.

The size of the growing area 102 may vary depending on the plants 104 being grown. In some embodiments, the growing area 102 may range between about 3 feet and 10 feet wide between the lateral sides 111 and 113 and between about 10 feet and 40 feet long between the first end 107 and a second end 109. For example, the growing area 102 may be about 4 feet to 6 feet wide and about 16 to 24 feet long.

The growing area has a receiving surface on which pots or containers in which the plants are located are placed, such as a table top, wherein the height of the receiving surface is adjustable. Alternately, the growing area may be a plant bed.

A plurality of plants 104 can be positioned within the growing area 102. In the example shown, the plants 104 are arranged into rows that extend along the length of the growing area 102 in the longitudinal direction 103. Although FIGS. 1 and 2 show two rows of plants 104 within the growing area 102, in some embodiments only a single row of plants 104 may be positioned within the growing area 102. Each row can extend between the first end 107 and the second end 109 in the longitudinal direction 103.

In some examples, the growing area 102 may be a table 115. The plants 104 may then be mounted on the surface 120 of table 115. For example, the table 115 may be about 5 feet wide (in the lateral direction 101) and about 20 feet long (in the longitudinal direction 103). The table 115 can define the dimensions of the growing area 102.

In some embodiments, the facility 100 may include a plurality of growing areas 102. For example, a plurality of spaced apart tables 115 can be included within the facility 100. The growing areas 102 (e.g. tables) may be separated by open spaces (e.g. substantially empty aisles) that allow cultivators to access the plants 104 in each growing area 102. This provides access to the plants 104 for trimming and/or harvesting.

As shown, the facility 100 also includes a lighting system 200. The lighting system 200 can be positioned above the plants 104 in the growing area 102. For example, the lighting system 200 may be suspended from the ceiling of the facility or from supports mounted adjacent to the growing area 102.

The lighting system 200 can include a plurality of light emitting elements facing the plants 104. In the example shown, the lighting system 200 includes a plurality of lighting units 210a-210c. Each lighting unit 210 has a light emitting side 211 positioned facing the surface 120 of the growing area 102. The lighting unit 210 can be controlled to provide a broad spectrum of light to the plants 104.

In some embodiments, the operation of the lighting units 210a-210c may be controlled to provide a regular cycle of active and inactive periods that may be selected based on the plants 104 being cultivated. For example, the lighting units 210 may be controlled to provide a cycle of 16 hours active periods and 8 hour inactive periods. Various other examples of light activation cycles may be used depending on the desired cultivation environment.

One or more lighting units 210 can be positioned above the same growing area 102. In the example shown in FIGS. 1 and 2, three lighting units are positioned above growing area 102.

Lighting System for an Indoor Cultivation Facility

In some embodiments, it may be desirable to minimize the variation of light intensity at a specified distance from the lighting units in order to provide substantially uniform light intensity for multiple plants within a growing area. This may facilitate more uniform growth for all of the plants within the growing area. This may also minimize the power required for the lighting system to provide a desired level of light intensity. In particular, a large greenhouse may require one or more megawatts of power, such a 5 or more, 10 or more or 15 or more megawatts. Such a power requirement is a factor that may control where a greenhouse is located. Reducing the overall power requirement may facilitation the location of a greenhouse. Providing a more even light intensity across the surface 120 may reduce the power requirements for a greenhouse.

In embodiments described herein, the lighting system can include a plurality of lighting units positioned close to the top of the plants within the growing area. For example, the lighting units may be positioned within about 6 inches to 18 or 6 to 12 inches of the top of the plants. This may minimize the lateral spread of light emitted from individual lighting elements. This may also help reduce the variance in light intensity across the surface of the plants.

In some embodiments, the lighting units can be arranged so that the overlap of light between adjacent lighting units is reduced. The lighting system for a particular growing area can include lighting units that extend for substantially all of the longitudinal length of the growing area. Multiple lighting units can be laterally spaced to provide substantially even light intensity across the lateral width of the growing area. In some embodiments, the lighting units and/or the point sources of light (e.g., LEDs in the lighting units) may be laterally spaced by between about 6 and 24 inches, 12 and 24 inches or 15 and 20 inches to facilitate more uniform light intensity at the tops of the plants.

In some embodiments, the lighting system may also be vertically movable. The lighting system may include a height adjustment controller operable to raise the lighting units in response to plant growth. This can help maintain a consistent distance between the lighting units and the tops of the plants throughout the growth cycle. Accordingly, as the plants grow, the intensity of the light at the level of the top of the plants may remain generally constant.

It may also be desirable to facilitate installation and maintenance of the lighting system of an indoor cultivation facility. In embodiments described herein, the lighting system may include a plurality of lighting units. Each lighting unit may include a plurality of lighting fixtures. The plurality of lighting fixtures can be connected in sequence to define a longitudinally extending lighting unit. The lighting fixtures can be connected to one another in a modular fashion to facilitate installation and replacement. The light fixtures can be connected to one another in sequence to facilitate routing of the power through the lighting system. In some embodiments, each lighting fixture may include a plurality of light cards. Each light card may include a plurality of light sources. The light cards may be individually replaceable from the corresponding light fixtures.

In some embodiments, it may be desirable to facilitate maintenance of a power supply unit for the lighting system of an indoor cultivation facility. The power supply unit may contain active control circuitry that is configured to control the power provided to the lighting units in the lighting system. When there is a malfunction in the power supply unit, access to the power supply unit may be necessary to ensure proper operation of the lighting system. In some embodiments, the power supply unit (or power supply units) for the lighting system can be positioned at the longitudinal ends of a growing area. This may provide easier access to the power supply units for maintenance and/or replacement since the power supply units can be accessed from outside the growing area (e.g., an aisle between surfaces 120) and without having to reach across or over the growing area.

The features in this section may be used by itself in any system or facility (e.g., an indoor cultivation facility) or in any combination or sub-combination with any other feature or features described herein.

Referring again to FIGS. 1 and 2, the lighting system 200 can include a plurality of lighting units 210 positioned above the plants 104. The lighting units 210 can be mounted above the plants, e.g. suspended from the ceiling of the facility 100.

A light emitting face 211 of each lighting unit 210 can be positioned facing the tops 105 of the plants.

In some embodiments, the lighting unit 210 may be positioned with the light emitting face 211 within about 100 mm to about 400 m of the tops of plants 104. In some embodiments, the light emitting face 211 may be positioned within about 150 mm to about 300 mm (6 inches-12 inches) of the tops 105 of plants 104.

Positioning the lighting units 210 in close proximity to the plants 104 may reduce the lateral spread of light emitted from each of the lighting units 210. By reducing the spread of light emitted from each lighting unit 210, the variation in light intensity across the surface of the plants 104 may be reduced.

In some embodiments, the lighting units 210 can be movably mounted within the facility 100. The lighting units 210 may be movable in a vertical direction 117 towards and away from the surface 120 of the growing area 102. The vertical position of the lighting units 210 can be adjusted to maintain a consistent separation between the light emitting face 211 and the tops 105 of the plants 104 as the plants grow. As shown in FIG. 2, the lighting units 210 have been raised in the vertical direction in response to growth of the plants 104.

The lighting system 200 can include a height controller (not shown) that is usable to adjust the position of the lighting units 210. The controller may be coupled to one or more sensors usable to measure the height of the plants 104 (e.g. cameras positioned facing the growing area 102). The controller may automatically adjust the height of the lighting units 210 to maintain a consistent separation between the light emitting side 211 and the plants 104.

In some cases, positioning the lighting units 210 close to the plants 104 may increase the heat emitted from the lighting units 210 proximate the plants 104. Too much heat on the surface of the plants 104 may harm plant growth. To minimize the impact of heat on plant growth, the lighting units 210 can be configured to reduce the amount of heat that is dissipated towards plants 104.

In some embodiments, the lighting units 210 can include one or more cooling elements. For example, the lighting units may include a heat sink which may be provided with cooling fins 240. The heat sink may comprise a thermally conducting material (e.g., aluminum) which is thermally connected to the cooling fins. The cooling fins may be part of a unitary construction with the heat sink (e.g., they may be integrally formed such as by casting). Optionally, the housing or support frame 222 of the light fixture may comprise or consist of the heat sink. For example, the housing of a lighting unit 210 may be made of a heat sink material, such as aluminum, which has cooling fins 240 provides as a unitary or integrally formed member. The cooling fins may promote the dissipation of heat that is generated by the lighting units 210 away from plants 104.

Figure 4:
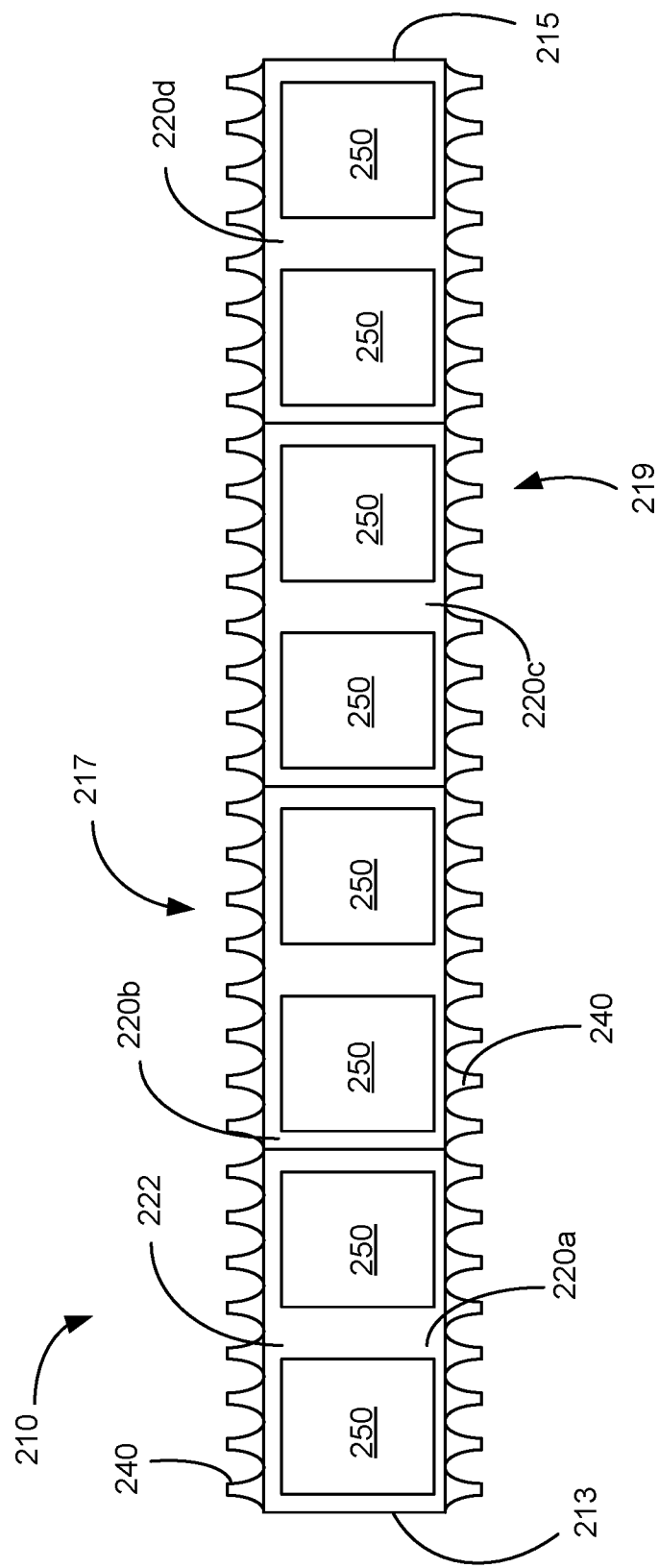
FIG. 4 is a plan view of an example lighting unit that may be used with an indoor cultivation facility in accordance with an embodiment.
Figure 5:
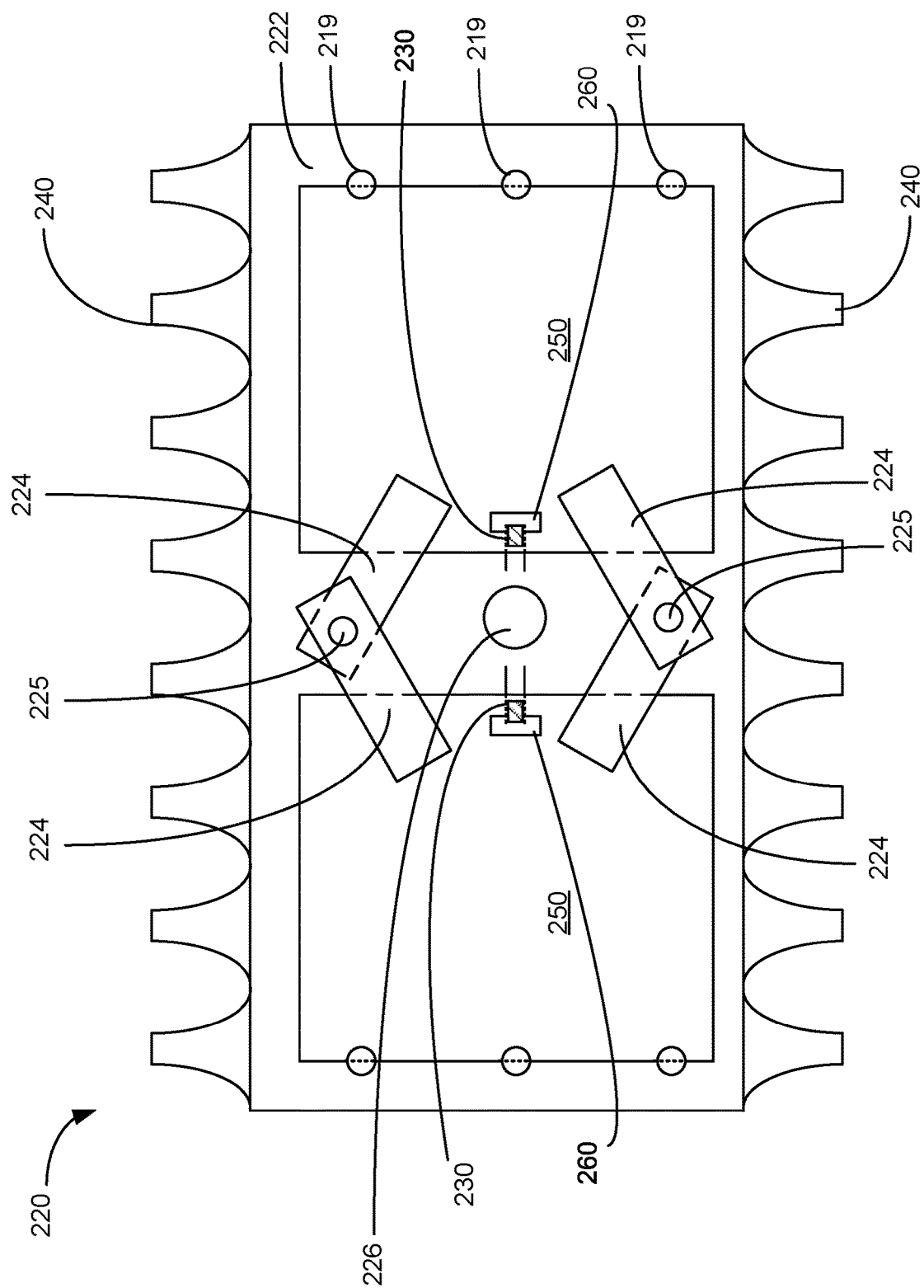
FIG. 5 is a bottom plan view of an example lighting fixture that may be used with the lighting unit of FIG. 4 in accordance with an embodiment.

As shown in FIG. 4, the lighting units 210 can include a support frame 222 into which a plurality of light emitting units (or light cards) 250 can be mounted. In the example shown, the lighting unit 210 is configured as a plurality of separate light fixtures 220 mounted to one another in sequence. In this example, the individual light fixtures 220 are formed separately (e.g. roll formed) and then secured to one another.

Alternatively, the lighting unit 210 may be formed as a single longitudinally extending fixture. For instance, a single roll formed lighting unit may be manufactured to extend along the length of the growing area. The combined fixture provided by the lighting unit 210 may include mounting elements for the same arrangement and configuration of light emitting units as the separate fixtures shown in FIG. 4.

The support frame 222 can be manufactured using thermally conductive materials (e.g. metallic materials) predisposed to absorb heat emitted by the light emitting units 250 and any power distribution elements within the lighting unit 210. The support frame 222 can operate as a heat sink to capture heat from the light emitting units 250 or power distribution elements (such as power transmission wires).

The support frame 222 can be thermally coupled to the cooling fins 240. The cooling fins 240 can disperse heat from the support frame 222 away from the plants 104. In some embodiments, the cooling fins 240 may be formed integrally with the support frame 222 when the support frame 222 is manufactured. This may encourage greater heat transfer between the frame and cooling fins 240.

As shown in FIGS. 1 and 2, the cooling fins 240 can be positioned on an upper section of the lighting units 210 (away from the plants 104). The fins 240 may thus distribute the heat from the lighting units 210 at a location further from the plants 104 than where the heat is initially generated. This may further reduce the heat applied to plants 104 by dissipating the heat away from the tops 105 of plants 104.

As shown in FIGS. 1 and 2, the lighting system 200 can include multiple lighting units 210. Each lighting unit 210 may extend substantially the entire longitudinal length of the growing area 102. The lighting units 210 can be laterally spaced apart above the growing area 102.

As shown, three lighting units 210 are laterally spaced apart in order to reduce the variation in light intensity across the lateral width of the growing area 102. In some embodiments, the lighting units 210 may be laterally spaced by between about 10 inches and 24 inches. In some embodiments, the lighting units 210 may be laterally spaced apart by between about 12 inches and 20 inches. In some embodiments, the lighting units may be laterally spaced apart by about 18 inches.

The spacing of the lighting units may promote more uniform light intensity at the tops of the plants 104. This may also reduce the total number of light emitting elements required to illuminate growing area 102, which may reduce the overall power required for facility 100.

Figure 3:
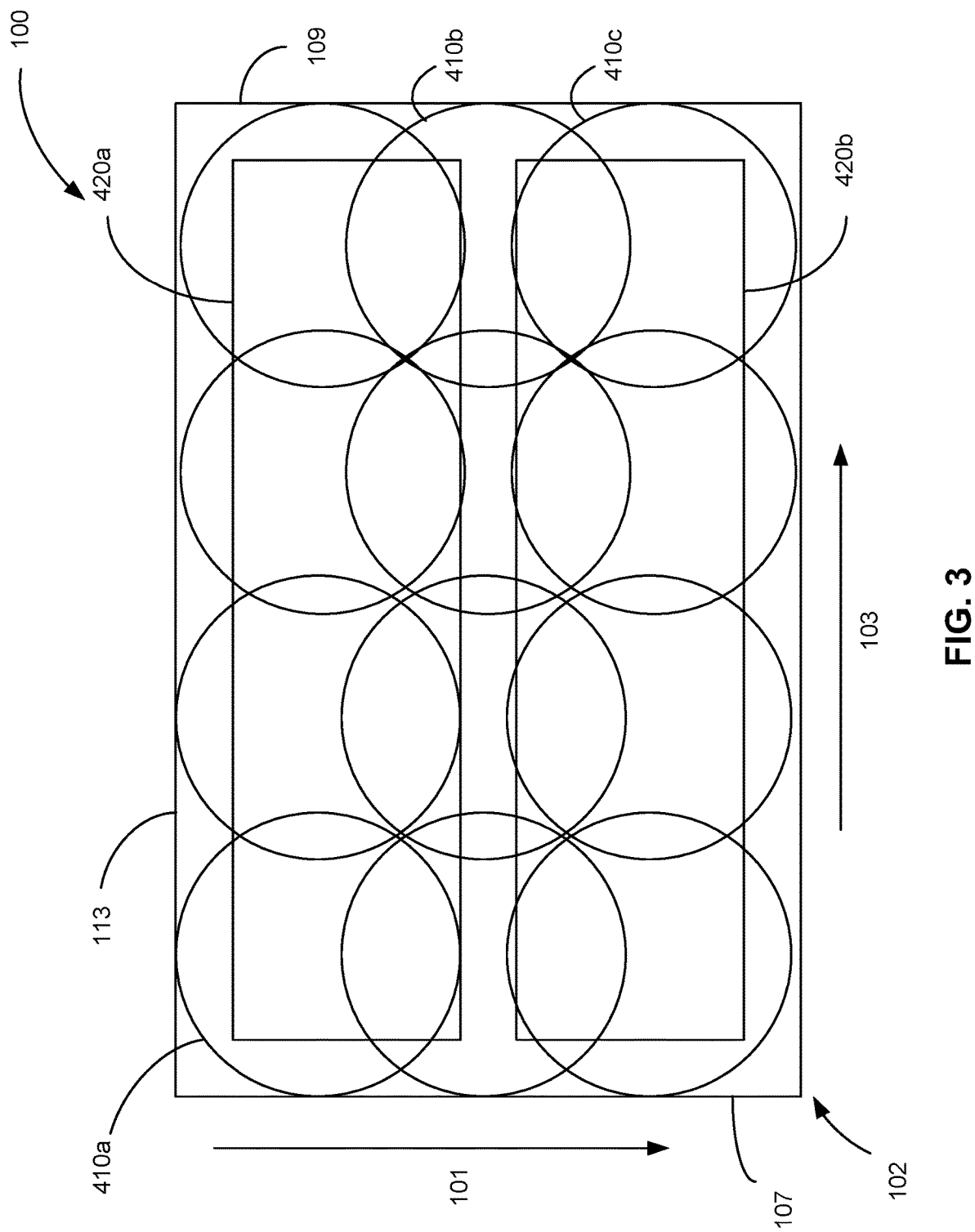
FIG. 3 is a schematic illustration of light emitted from an example lighting system that may be used with the indoor cultivation facility of FIG. 1 in accordance with an embodiment.

FIG. 3 illustrates an example of the light emission regions 410 from the lighting units 210a-210c in facility 100. As shown, the growing area 102 includes a pair of longitudinally extending rows 420a and 420b of plants. The light emission regions 410, include regions 410a corresponding to lighting unit 210a, regions 410b corresponding to lighting unit 210b, and regions 410c corresponding to lighting unit 210c. As described in further detail below, the lighting elements within individual light fixtures may be arranged to provide relatively uniform light intensity patterns for the growing area 102.

In some embodiments, the light emission regions from individual fixtures may include less than 25%, less than 20%, less than 15%, less than 10% or less than 5% overlapping area (at the plant surface) with adjacent light emission regions. The overlap may be adjusted by the spacing of the light sources from each other and the height of the light sources from the top of the plants.

As shown in FIG. 4, each lighting unit 210 may include a plurality of light fixtures 220. In the example illustrated, the lighting units 210 include four light fixtures 220a-220d. The light fixtures 220 in each lighting unit 210 can be positioned in a sequence end-to-end extending substantially between the first end 107 and second end 109 of the growing area.

Each fixture 220 may include one or a plurality of light cards 250. Each light card 250 may include a plurality of light emitting elements such as light-emitting diodes (see e.g. FIG. 10). The light cards 250 may be individually replaceable within each light fixture 220. This may facilitate modular replacement of the light emitting elements in case of failure of one or more light emitting elements or light cards. Examples of light fixtures 220 with replaceable light cards 250 are described in further detail herein below.

Each of the lighting units 210 may emit light in a rectangular or cone shape pattern with minimal variation across the emission pattern. As will be described in further detail below, the light emitting elements within each fixture 220 can be arranged to provide a light intensity pattern that varies minimally throughout the growing area 102. The lighting units 210 can be configured with a greater number of light emitting elements positioned near the lateral sides of each lighting unit 210 as compared to light emitting elements positioned near the lateral center of the lighting units 210. This may assist in maintaining consistent intensity due to overlap of light from light emitting elements within a lighting unit and between laterally adjacent lighting units 210.

In some embodiments, the power supply unit for the lighting system 220 may be mounted above the growing area 102 to provide close connection to the lighting units 210. However, when there is a malfunction in the power supply unit, access to the power supply unit may be necessary to ensure proper operation of the lighting system. If the power supply unit is positioned above the growing area 102, it may be necessary to climb above the tables 115 to access the power supply unit and perform any repairs or replacement.

Mounting the power supply also requires high power wiring to be included above the growing area 102. As these high power connections may have increased rates of failures, it may be necessary to perform repairs and/or maintenance on a fairly regular basis. This may also increase the concentration of heat emitted above the growing area, which may require additional building insulation in those areas of the facility.

In some embodiments, the power supply unit (or power supply units) for the lighting system 200 can be positioned at one or both of the longitudinal ends 107 and 109 of the growing area 102. The lighting units 210 can be arrayed longitudinally along the length of the table with the electrical supply at a longitudinal end of the fixtures. The power supply can provide the power connections to the lighting units 210 at the longitudinal end. The power supply unit and wiring connection may then be accessed at the end of a row of plants 104, rather than above the growing area 102. This may provide easier access to the power supply units for maintenance and/or replacement since the power supply units can be access from outside the growing area and without having to reach across or over the growing area.

Figure 15:
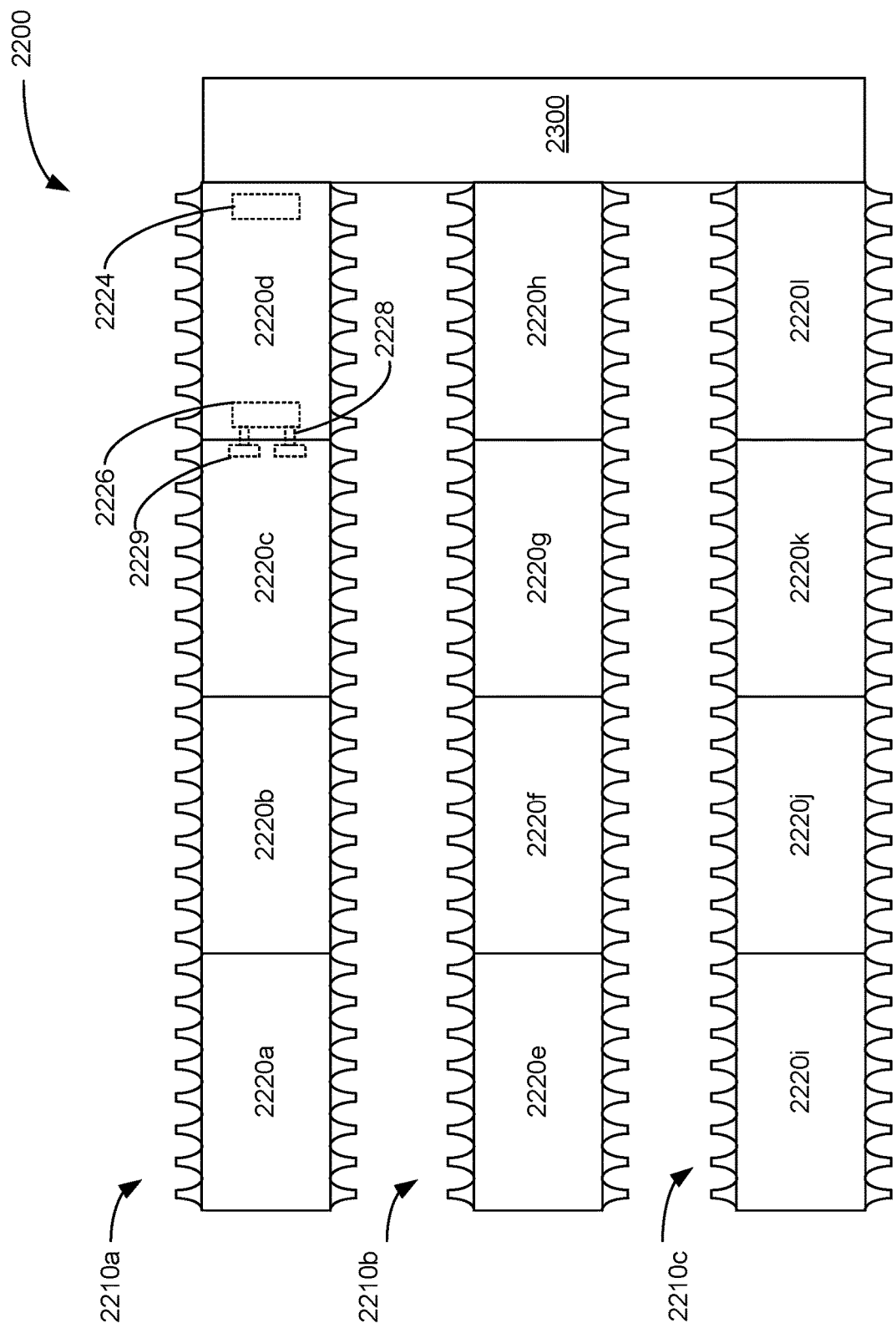
FIG. 15 is a top plan view of an example lighting system including a power supply unit in accordance with an embodiment.

FIG. 15 illustrates a first example of a lighting system 2200 that includes a power supply unit 2300. As shown in FIG. 15, the power supply unit 2300 is electrically connected to a plurality of lighting units 2210a-2210c. Each lighting unit 2210 includes a plurality of light fixtures 2220. Lighting unit 2210a includes lighting fixtures 2220a-2220d connected end to end in sequence, lighting unit 2210b includes lighting fixtures 2220e-2220h connected end to end in sequence, and lighting unit 2210c includes lighting fixtures 2220i-2220l connected end to end in sequence.

As shown, the power supply unit 2300 is electrically connected to a first end of light fixtures 2220d, 2220h and 2220l. As shown, in embodiments herein the power supply unit 2300 may not be directly connected to any of the other light fixtures in each lighting unit 2210a-2210c. Rather, the lighting units 2210 may provide internal power routing that connects each light fixture 2220 to the power supply unit 2300. Routing power through the light fixtures 2220 may simplify maintenance of the power routing structure, as faults in individual light fixtures 2220 can be replaced without having to re-wire the entire system 2200.

For example, to provide power to the lighting unit 2210a, the power supply unit 2300 may have a direct electrical connection to the light fixture 2220d. The light fixture 2220d may include internal wiring that connects to the power supply unit 2300 and then to adjacent light fixture 2220c. Light fixture 2220c may thus be connected to the power supply unit 2300 indirectly, via the light fixture 2220d. Similarly, light fixture 2200b can provide wiring that interconnects light fixtures 2220c and 2220a. This allows light fixtures 2220a and 2220b to also be connected indirectly to the power supply unit 2300. Lighting units 2210b and 2210c may similarly provide indirect power connections for the light fixtures 2220 that are not directly adjacent to the power supply unit 2300. This may allow the light fixtures 2220 to be easily replaced without modifying the wiring from the power supply unit.

For example, light fixture 2220d may have an internal bus 2224 which interfaces with power supply unit 2300 (e.g., power supply unit 2300 plugs into the bus). Bus 2224 may have 4 sets of outputs, each of which is connected to one of light fixtures 2220a, 220b, 2220c and 2220d. For example, light fixture 2220d may have a second bus 2226 that is electrically connectable to adjacent light fixture 2220c by, e.g., electrical connectors 2228. Adjacent light fixture 2220c may have mating electrical connectors 2229 that are connectable or releasably connectable to electrical connectors 2228. Accordingly, when light fixture 2220c is connected or plugged into light fixture 2220d, the LEDs in lighting unit 2220c may be electrically connected to power supply unit 2300. It will be appreciated that bus 2224 may be electrically connected to the light card(s) in light fixture 2220d in parallel with bus 2226.

Alternatively, the power supply unit 2300 may have direct wiring connections to each of the light fixtures 2220a-2220l. This may facilitate individual control of the light emitted from each fixture 2220, without requiring additional control circuitry at the fixture. For example, a first set of wires may extend from bus 2224 to light fixture 2220c and a second set of wires may extend from bus 2224 to light fixture 2220b and a third set of wires may extend from bus 2224 to light fixture 2220a.

Providing integrated power routing through the lighting fixtures 2220 may reduce the number of wiring connections to the power supply unit 2300. Rather than having separate connections for each fixture 2220, the power supply unit 2300 may have only a single connection for the plurality of fixtures 2220 in each lighting unit 2210. This may reduce the total length of wiring required, and simplify repairs and/or replacement of any faulty wires.

Figure 16:
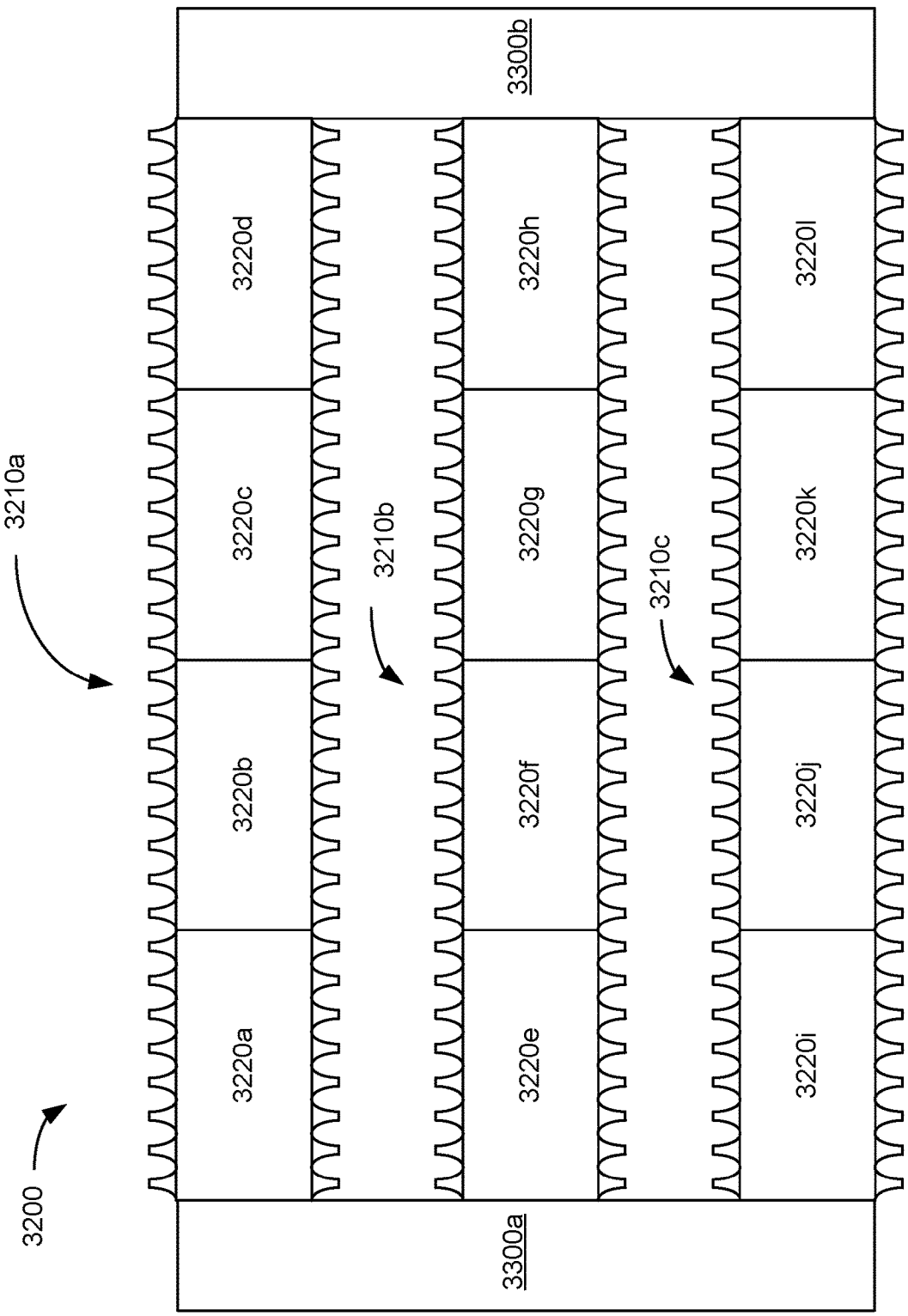
FIG. 16 is a top plan view of an example lighting system including multiple power supply units in accordance with an embodiment.

FIG. 16 illustrates another first example of a lighting system 3200. Lighting system 3200 includes power supply units 3300a and 3300b connected to each longitudinal end of the lighting units 3210.

As shown in FIG. 16, each power supply unit 3300 is electrically connected to a plurality of lighting units 3210a-3210c. Each lighting unit 3210 includes a plurality of light fixtures 3220. Lighting unit 3210a includes lighting fixtures 3220a-3220d connected end to end in sequence, lighting unit 3210b includes lighting fixtures 3220e-3220h connected end to end in sequence, and lighting unit 3210c includes lighting fixtures 3220i-3220l connected end to end in sequence.

As shown, the power supply unit 3300a is electrically connected to a first end of light fixtures 3220a, 3220e and 3220i. Similarly, the power supply unit 3300b is electrically connected to a first end of light fixtures 3220d, 3220h and 3220l. As with system 2200, the power supply units 3300 may be directly connected to only one light fixture 3220 within a given lighting unit 3210. The light fixtures 3220 may then provide routing between the internal fixtures and the power supply units 3300.

In system 3200, power supply unit 3300a may provide power to the fixtures 3220 in a first half of each lighting unit 3210 while the power supply unit 3300b provides power to the fixtures 3220 in the other half of each lighting unit 3210. For example, power supply unit 3300a may be electrically connected to light fixtures 3220a, 3220b, 3220e, 3220f, 3220i and 3220j and none of the other lighting fixtures while power supply unit 3300b is electrically connected to light fixtures 3220c, 3220d, 3220g, 3220h, 3220k and 3220l and none of the other lighting fixtures.

Providing separate power supply units for the segments of lighting units 3210 may reduce the power being delivered by each individual power supply unit 3300, while still providing simplified access to the power supply units outside of the growing area 102.

Alternatively, the power supply units 3300a and 3300b may both be electrically connected to all of the fixtures 3220. The power supply units 3300a and 3300b may then operate as redundant power supplies in case one of the power supply units 3300 malfunction. This may allow the lighting system 3200 to continue operating (although possibly at reduced power levels) during maintenance or repairs of one of the power supply units 3300.

Additionally or alternatively, one or more power supply units may be positioned centrally above the growing area 102. This may be necessary in some embodiments to manage the power requirements of the lighting system 3200.

Figure 18:
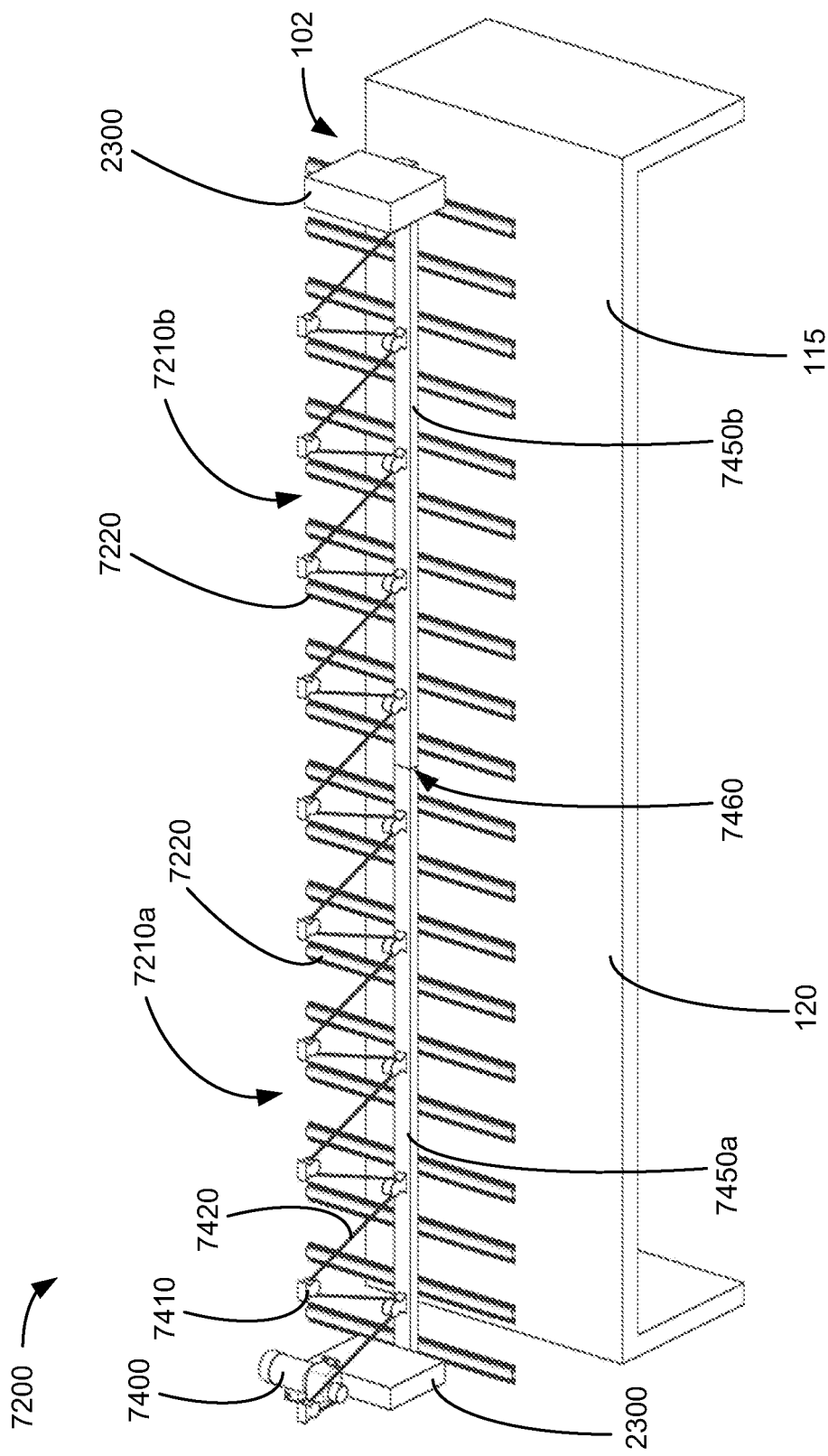
FIG. 18 is a perspective view of another example lighting system for an indoor cultivation facility in accordance with an embodiment.

Referring now to FIG. 18, shown therein is another example of a lighting system 7200 that may be used in embodiments described herein. As shown, the lighting system 7200 can be positioned above the surface 120 of a growing area 102 such as a table 115.

In the example shown, the lighting system 7200 includes two lighting units 7210a and 7210b. Each lighting unit 7210 includes a plurality of light fixtures 7220. The lighting fixtures 7220 may be generally similar to lighting fixtures 220, 1220, and 2220 described elsewhere herein.

Lighting system 7200 is similar to lighting system 3200 in that a pair of power supply units 2300 are positioned at either end of the growing area 102. In the example shown, each power supply unit 2300 is electrically connected to a corresponding lighting unit 7210. As mentioned, the power supply unit 2300 may be connected to the interior light fixtures within the lighting units 7210 either directly or indirectly. The fixtures 7220 may be connected to the power supply unit 2300 in parallel. This may ensure that failure of an individual light fixture 7220 does not cause failure of the other light fixtures 7220.

Unlike lighting systems 200, 2200 and 3200 described herein above, however, the lighting fixtures 7220 in lighting system 7200 extend transversely across the growing area 102. In some examples, the lighting system 7200 may include a single row of lighting units 7210, with a plurality of laterally extending light fixtures 7220 that are spaced apart longitudinally along the growing area 102.

The lighting system 7200 includes a mounting track 7450. The light fixtures 7220 are mounted to the underside of the mounting track 7450 with light emitting surfaces facing the surface 120 of the growing area 102. Each lighting unit 7210a and 7210b can be mounted to a separate track section 7450a and 7450b respectively. The track sections 7450a and 7450b may be joined at a central track joint 7460.

The track sections 7450a and 7450b can include a hollow center. The hollow center can be used to route wires between the power supply units 2300 and the light fixtures 2220.

As exemplified, a power supply unit 2300 is electrically connected to one end of a track 7450. Track 7450 includes a channel through which wires extend. A separate set of wires may be electrically connected to the power supply 2300 and extend to each light fixture 7220. For example, one set of wires may extend to the light unit 72220 adjacent power supply unit 2300 and a second set of wires may extend to the second light unit 7220 that is spaced from the power supply unit 2300, etc. Track 7450 may include a bus from which the wires extend and to which power supply module is electrically connectable.

The lighting units 7210 in lighting system 7200 may be vertically movable. As shown, the lighting system may include a plurality of support mounts 7410 that may be secured to the ceiling of the facility 100 or another support structure. The support mounts 7410 are connected to the mounting track 7450 using a pulley system. A motor 7400 can extend or retract the support cables 7420 to lower or raise the track 7450 and thus raise or lower the light fixtures 2220.

In some cases, there may be only one light fixture 2220 mounted to the track 7450 at a given longitudinal location above the growing area 102. The light fixture 2220 may be oriented to extend laterally across at least a portion of the growing area 102.

Alternatively, two light fixtures 2220 may be mounted extending from either lateral side of the track 7450. This may facilitate light emission for wider growing areas 102.

Lighting Fixture for a Lighting System

In some embodiments, it may be desirable to facilitate replacement of individual sections of the lighting units. In embodiments described herein, the light cards within each lighting fixture may be individually replaceable to facilitate maintenance of the lighting system in-situ.

In some embodiments, the light cards may be replaceable from the side of each lighting unit. This may facilitate access to the light cards individually, without removing any cover or lens overlying the light emitting face of the light fixture.

In some embodiments, the light emitting elements within the light fixtures may be arranged to reduce variation in illumination intensity even between adjacent light fixtures. This may promote more even growth of the plants within the cultivation facility.

The features in this section may be used by itself in any system or facility (e.g., an indoor cultivation facility) or in any combination or sub-combination with any other feature or features described herein.

Referring to FIGS. 5-10, shown therein is an example of a light fixture 220. The light fixture 220 is an example of a light fixture that may be used with the various examples of plant lighting systems described herein.

As shown, the light fixture 220 includes a fixture frame 222. The fixture frame 222 can define the structural shape of the light fixture 220. The fixture frame 222 can also include mounting elements that allow the light fixture 220 to be connected to adjacent light fixtures and to mount light cards within the light fixture 220.

The light fixture 220 includes light card mounting elements. The light card mounting elements allow one or more light cards 250 to be releasably mounted to the light fixture 220. In the example shown, two light cards 250 can each be mounted to a single light fixture 220. It will be appreciated that a single light fixture 220 may house more than two light cards or only a single light card 250.

As exemplified, the mounting elements include a plurality of retaining arms 224. The retaining arms 224 can be positioned centrally within the frame 222. The retaining arms 224 can support a first side of a light card 250 mounted to the frame 222.

The mounting elements also optionally include a plurality of mounting supports 219. The mounting supports 219 may project out from the surface of the frame 222 and include an inset section into which the second side of the light card 250 can be mounted.

The retaining arms 224 may be moveably mounted to the frame 222. This may allow the light cards 250 to be easily mounted and removed from the frame 222.

As shown, the retaining arms 224 may be pivotally mounted to the frame 222. Each retaining arm 224 may be secured to the frame 222 by a corresponding pivotal mount 225. In some cases, retaining arms 224 for adjacent light card mounting regions may share a pivotal mount 225.

The retaining arm 224 may be rotatable about the pivotal mount 225. Each retaining arm 224 may be pivotal at least between a support position, where the retaining arm 224 overlies the light card region (in the case of FIG. 5, the region within which the light card is currently positioned) and an access position in which the retaining arm 224 does not extend over the projection of the light card region. The access position allows a user to insert and/or remove a light card 250 from the light card region.

In the example shown, the light cards 250 may be mounted by first inserting the second end 253 of the light card 250 into the insets provided by the support mounts 219. The light card 250 can then be rotated vertically to rest within the light card region above the retainer arms 224. The retainer arms 224 are then pivoted from the access position to the support position overlying the central end 251 of the light card 250 to retain the light card 250 within the light card region.

When mounted to the fixture 220, each light card 250 can include a power connection 230 with the fixture 220. The light card 250 may include a connector 260 that is engageable with a corresponding connector provided by the fixture 220 to define the connection 230.

The connection 230 includes at least power connections to couple the light emitting elements 270 (e.g. light emitting diodes) provided on the light card 250 to a power supply from the light fixture 220. As the light card 250 is rotated upwards into the light card region, the connector 260 may engage a corresponding connected provided on the frame 222. This may ensure that the light card 250 is automatically connected to a power source when mounted to the fixture 220 (presuming, of course, that the fixture 220 itself is connected to a power source).

Alternatively, a user may manually connect the connector 260 to a corresponding connector provided by the fixture 220. For example, the fixture 220 may include connectors that extend downward through the central gap or void region 226. When installing the light card 250, a user can simply connect these to the connector 260 on the light card 250.

It will be appreciated that other mechanical securing members may be used to releasably mount a light card in a fixture 220.

In some embodiments, the light fixture 220 may include a cover enclosing the light cards 250. For instance, a plastic cover can be provided on the light emitting face 211 of the fixture 220. The cover may include sealing members around the periphery of the fixture 220. This may provide a water-tight seal around the light cards 250 and other electrical components of fixture 220. For example, the cover may be compliant with various ingress protection standards such as IP65, IP66 and/or IP67.

In some embodiments, the cover may extend across multiple fixtures 220 (e.g. along some or all of the length of a lighting unit 210). The cover may then seal the lighting unit 210 as a whole, rather than individual lighting fixtures 220.

In some embodiments, the light fixture 220 may include one or more optical components between the light emitting elements on the light cards 250 and the plants 104. In some cases, a lens may be provided on the light emitting face 211. For example, the lens may be provided to further limit the spread of light from the lights cards.

Figure 10:
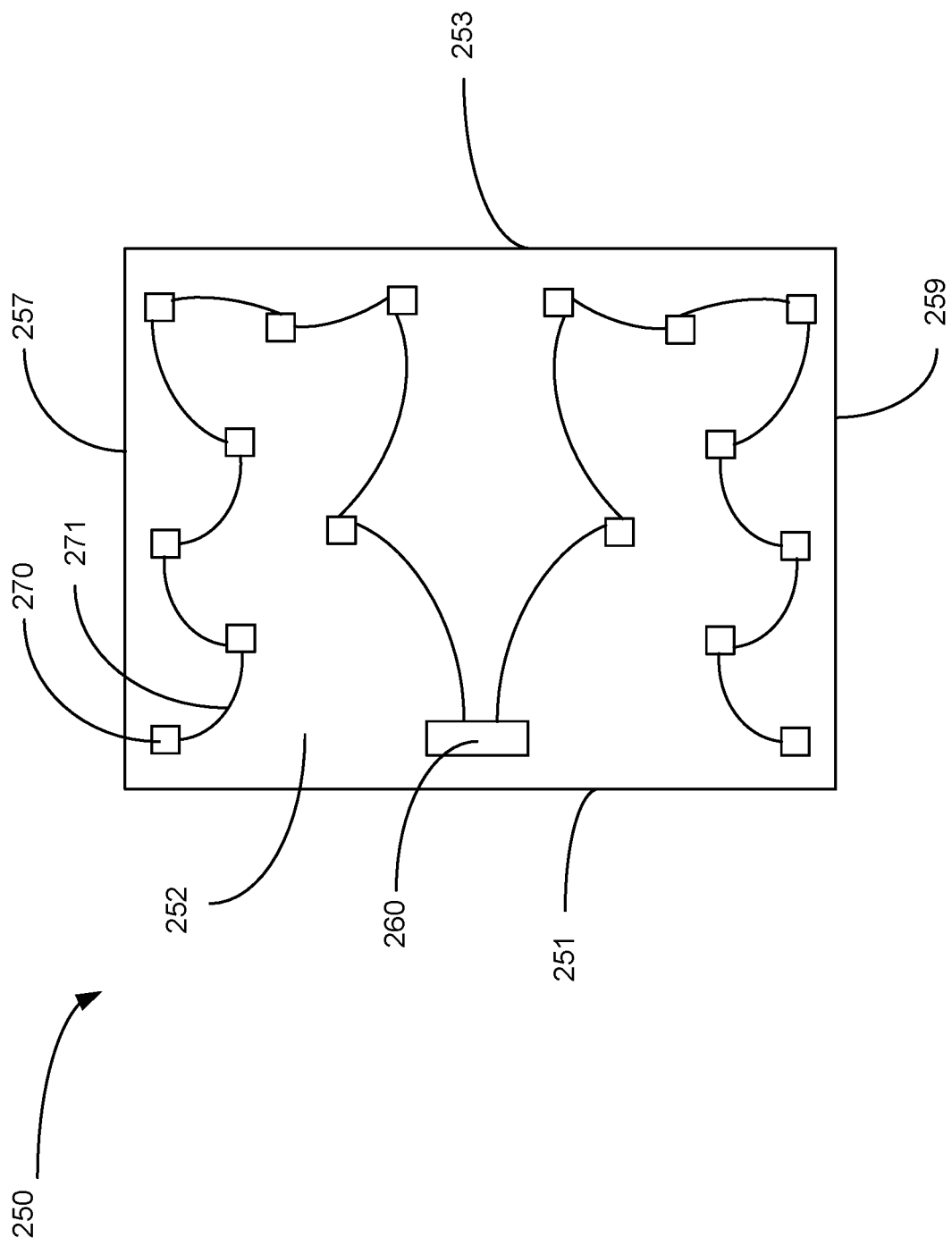
FIG. 10 is a bottom plan view of an example light card that may be used with the lighting fixture of FIG. 5 in accordance with an embodiment.
Figure 11:
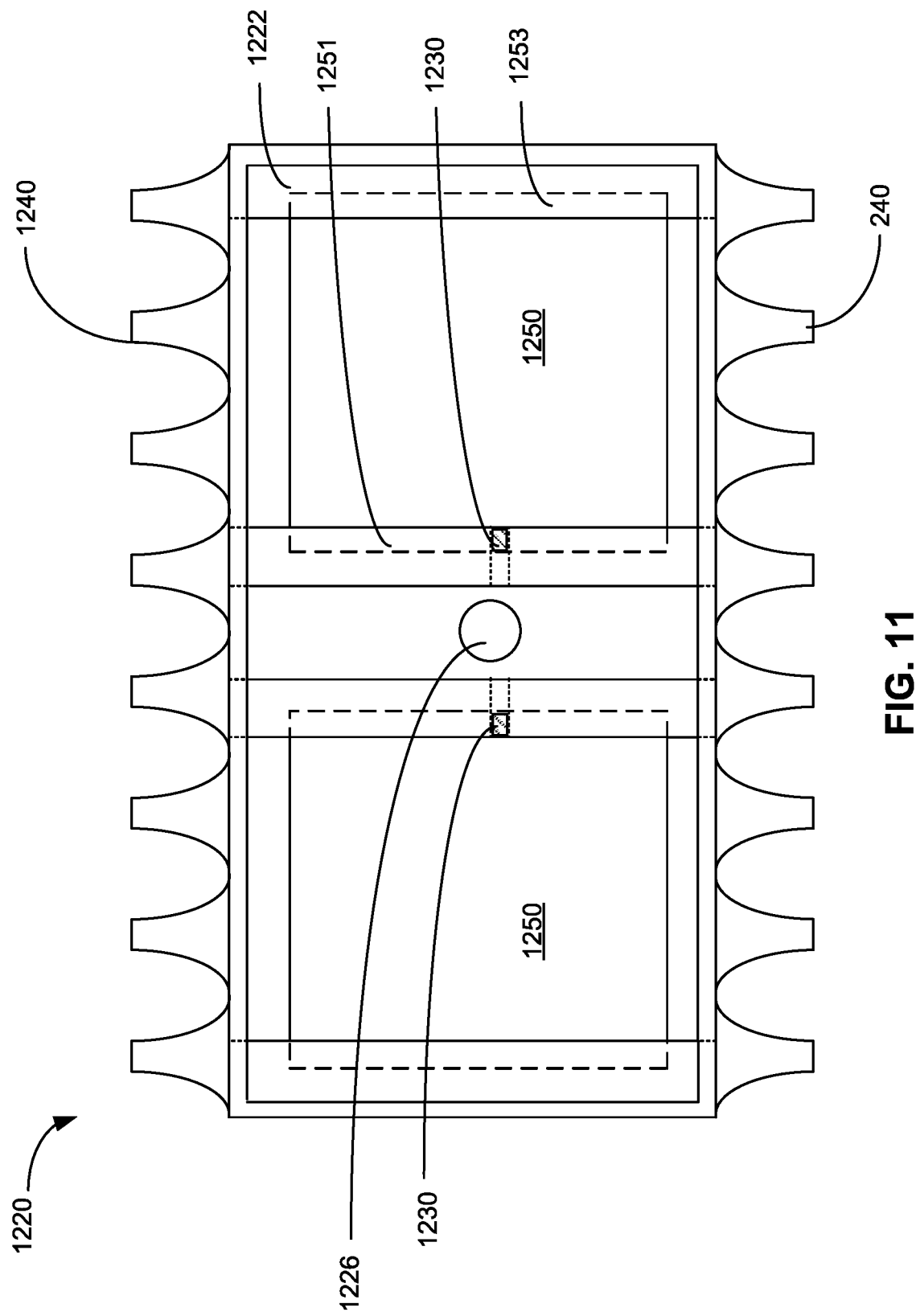
FIG. 11 is a bottom plan view of another example lighting fixture that may be used with the lighting unit of FIG. 4 in accordance with an embodiment.

As shown in FIG. 10, the light cards themselves can include a plurality of light emitting elements 270. The light emitting elements 270 can be distributed around the emission surface 252 of the light card 250. The distribution of the elements 270 may be defined to minimize intensity variations experienced at a distance of, e.g., between about 6 inches and 12 inches from the emission surface 252.

The light emitting elements 270 can be connected using sequential wiring 271 as exemplified or in parallel. Further, as exemplified, the light emitting elements 270 may be connected using two or more sequences of sequential wiring. The elements 270 can be connected to a light card connector 260 that may engage a corresponding connector on the fixture 220 to define power connection 230.

As shown, the light card 250 has a generally rectangular shape with a first or central end 251, a second or outer end 253, and opposed sides 257 and 259. The central end 251 can be configured to be positioned centrally within the fixture 220 when mounted thereto. It will be appreciated that light card 250 may be of any other shape.

As shown, the light emitting elements 270 can be distributed about the emission surface 252 to promote reduced light intensity variance for the individual light card 250. The light emitting elements 270 may be distributed about the emission surface to promote reduced light intensity variance for the plurality of light cards 250 arranged within the lighting system 200, even across multiple fixtures 220 and lighting units 210.

In some embodiments, the light intensity experienced at an illuminated surface, e.g., about 6 inches-12 inches from the emission surface 252 may vary less than 25%, less than 20%, less than 15%, less than 10% or less than 5% across the illuminated surface.

In general, the light emitting elements can be distributed on the light cards so that with the distribution of light fixtures and lighting units the light emitting elements throughout the lighting system can provide an overlap of lower intensity zones to provide better distribution of intensity across the surface of the plants 104.

In some embodiments, the light intensity experienced at the plant surface when positioned about 6 inches-12 inches from the emission surface 252 may vary less than 25%, less than 20%, less than 15%, less than 10% or less than 5% across the growing area 102.

As shown, the lighting elements 270 can be distributed with a greater number of light emitting elements 270 near the external sides 257 and 259 than near the middle of the emission surface 252. Similarly, more lighting elements can be positioned near the outer end 253 than near the central end 251.

Where the central end 251 is positioned nearer to an adjacent light card 250 (e.g. the other card within the same fixture) as compared to the second end 253 (which may be adjacent to a light card from a subsequent fixture), the reduced number of light emitting elements may be compensated for by the proximity of the elements from the nearby light card. Although each light emitting element may only slightly overlap with an adjacent light emitting element, the increase number of light emitting elements near the outer edges of the light cards 250 may contribute to an overall consistency in the light intensity distribution.

In a similar manner, positioning a greater proportion of the light emitting elements 250 near the lateral sides 257 and 259 may promote greater light emission onto plants 104 positioned in gaps between laterally adjacent lighting units 210. This may help ensure that the intensity experienced by plants in a gap is similar to that experienced by plants directly below a lighting unit 210.

Figure 6:
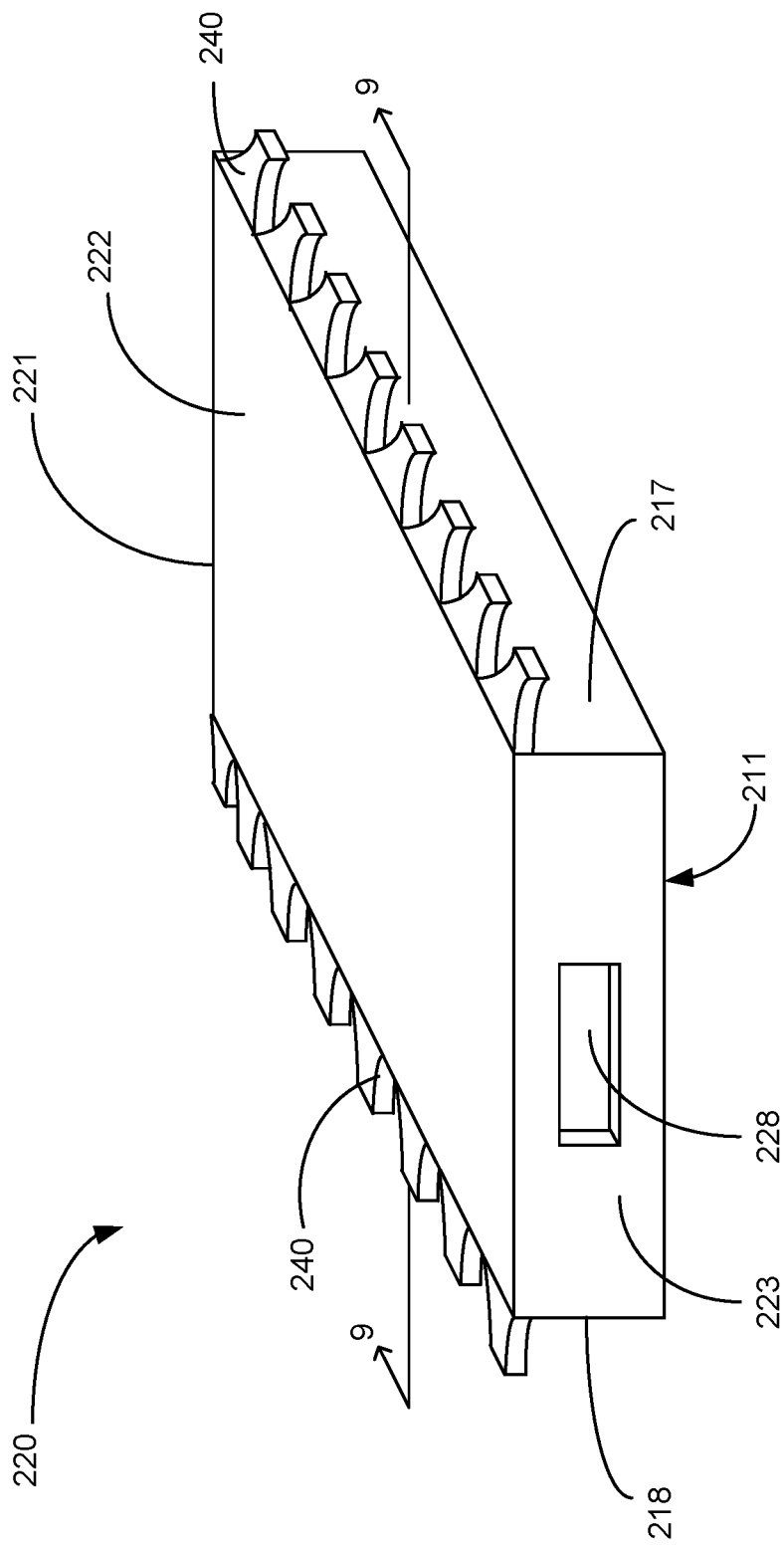
FIG. 6 is a top front perspective view of the lighting fixture of FIG. 5.
Figure 7:
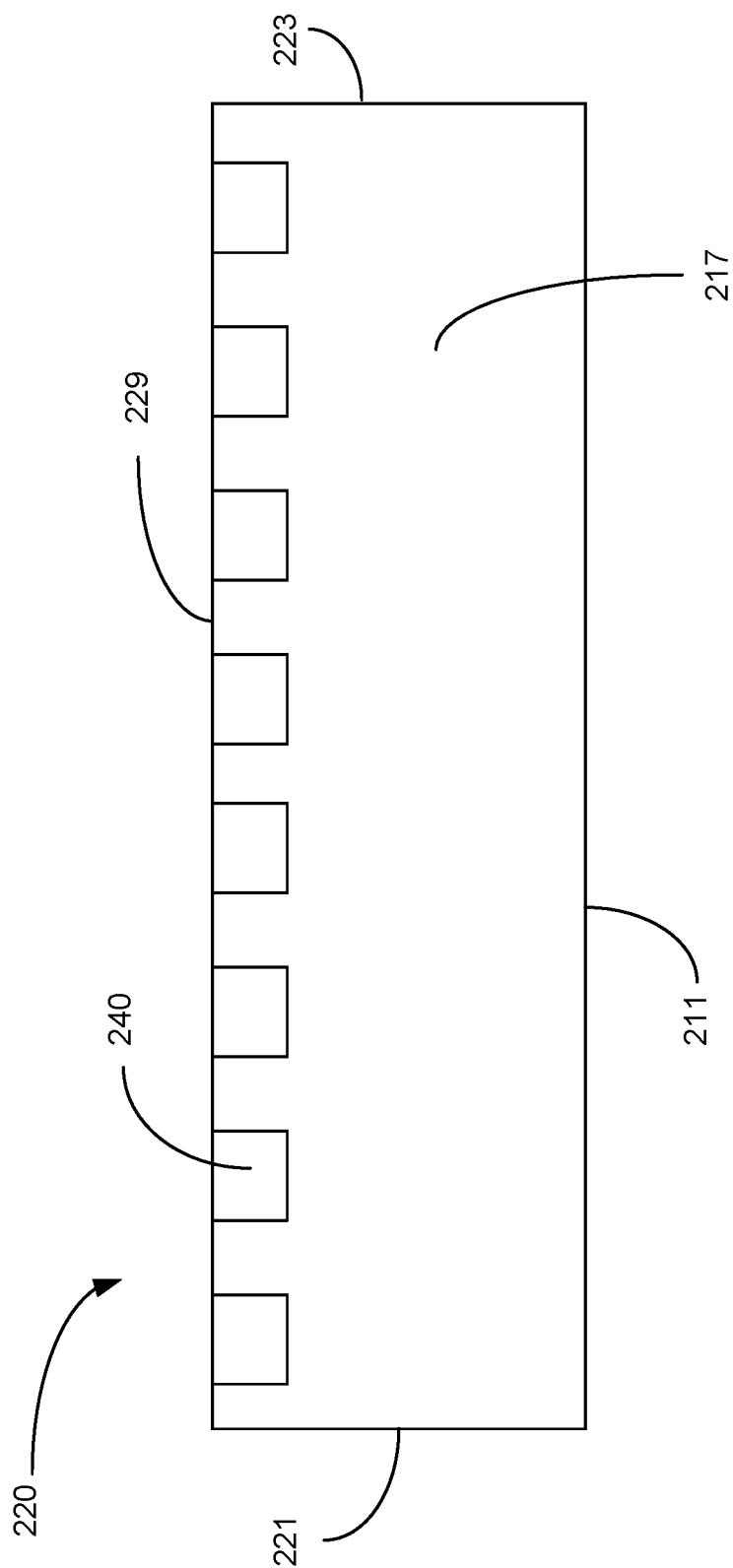
FIG. 7 is a side view of the lighting fixture of FIG. 5.
Figure 8:
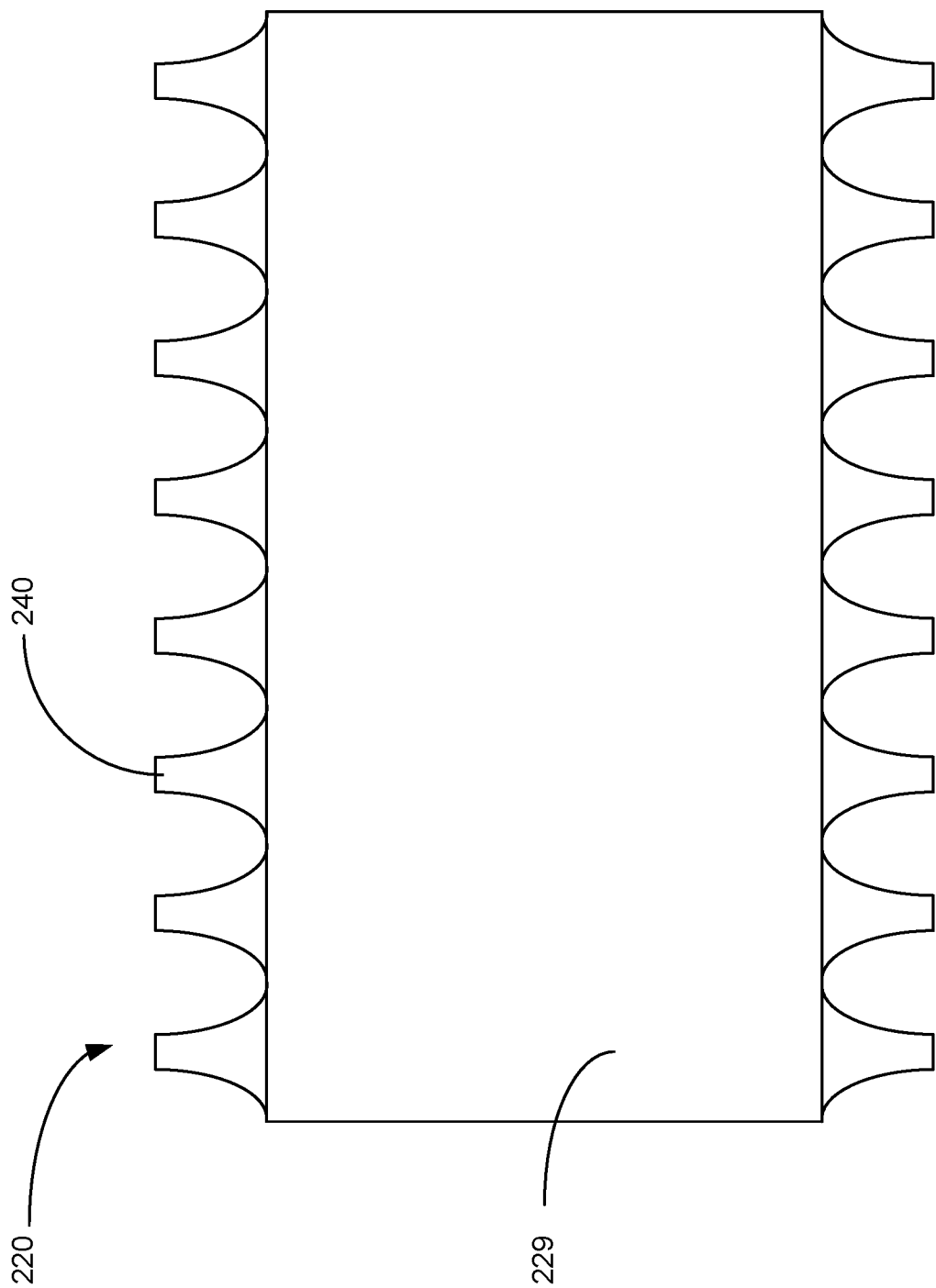
FIG. 8 is a top view of the lighting fixture of FIG. 5.

The light fixture 220 itself may have a generally rectangular shape (see e.g. FIG. 6). The light fixture 220 may have a length dimension that extends between a first end 221 and a second end 223, and a width dimension that extends between opposed lateral sides 217 and 218. The frame 222 may have a top surface 229 and sidewalls that extend downwardly therefrom on each of the first end 221, second end 223, and laterals sides 217 and 218.

The end walls of the frame 222 may include an opening or connector section 228. The connector section 228 may allow cable (wire) routing between adjacent light fixtures 220, such as lighting unit 210 described herein above. Accordingly, each light fixture 220 or each light card 250 may be individually electrically connected to a power supply unit 2300. In some embodiments, the adjacent fixtures 220 in the lighting unit 210 may provide alternating current power interconnections. Alternatively, the adjacent fixtures 220 in the lighting unit 210 may provide direct current power interconnections.

In some embodiments, the end walls of the frame 222 may also include fixture mounting elements (e.g., brackets, not shown). The fixture mounting elements may allow adjacent fixtures 220 to be secured to one another end to end and/or to a supporting superstructure, such as a track.

Figure 9:
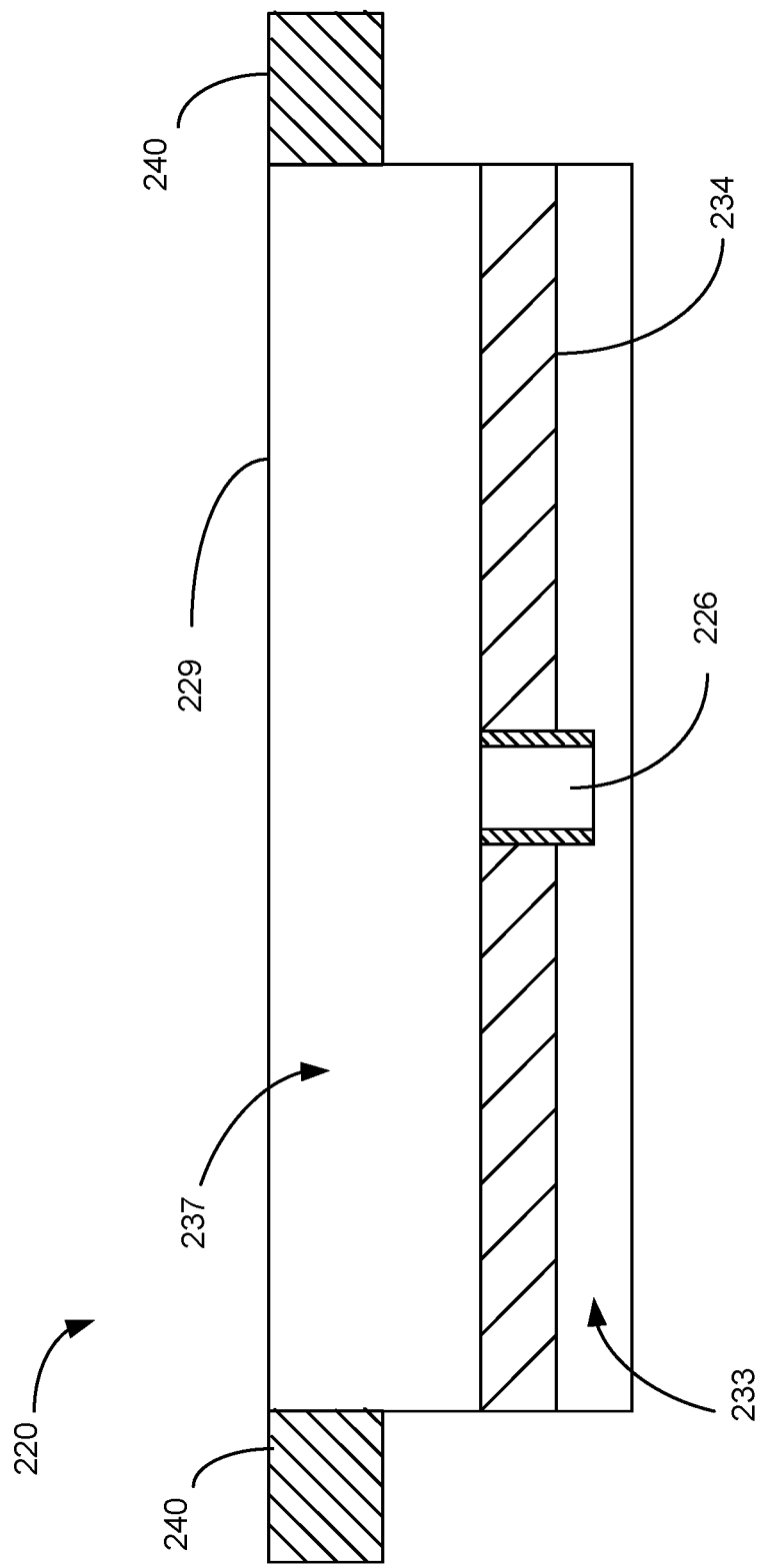
FIG. 9 is a cross-sectional view of the lighting fixture of FIG. 5 along line 9-9 shown in FIG. 6 in accordance with an embodiment.

In some embodiments, the fixture 220 may include separate internal compartments. For example, as shown in FIG. 9, the fixture 220 may be separated into an upper compartment 237 and a lower compartment 233. A wall member 234 can be positioned partially or fully separating the compartments 233 and 237. In some embodiments, the frame 222 may be roll formed with the two separate compartments 233 and 237 and wall member 234.

The upper compartment 237 may be configured to house and route wiring for the lighting unit 210. For example, the wiring between adjacent lighting fixtures, and the connections to the power supply unit(s) can be housed within the upper compartment.

The lower compartment 233 can be configured to contain the light emitting elements of the fixture 220. A conduit 226 can be provided between the upper compartment 237 and lower compartment 233 to allow the light cards 250 in the lower compartment 233 to be connected to the power supply.

Separating the light cards 250 from the wiring may help distribute the heat within the fixture 220 (e.g., wall member 234 may assist in transmitting heat from light cards 250 to cooling fins 240). This may also help remove the heat generated by power transmission from being in proximity to the plants.

As mentioned above, the fixtures 220 can be configured to promote heat dissipation away from the plants 104. The frame 222 may be manufactured of thermally conductive materials. For example, the frame 222 may be manufactured using roll formed aluminum. The frame 222 may thus operate as a heat sink to collect heat generated by operating of the lights cards 250 and due to power transmission through the power wiring.

Optionally, as exemplified, the frame 222 can also include cooling fins 240. The cooling fins can optionally extend laterally outward form the lateral sides 217 and 218 of the frame 222. The cooling fins 240 can provide added surface area for dissipation of the heat collected by the frame 222.

In the example shown, the cooling fins 240 are positioned proximate the top surface 229 of the frame 222. This may encourage more heat to dissipate at a greater distance from the plants 204.

Referring now to FIGS. 11-14, shown therein is another example of a light fixture 1220 that may be used in the lighting systems described herein. As with light fixture 220, the light fixture 1220 includes a fixture frame 1222, cooling fins 1240, and a plurality of light cards 1250 mounted to the fixture frame 1222. However, the light fixture 1220 includes different light card mounting elements than fixture 220.

Figure 12:
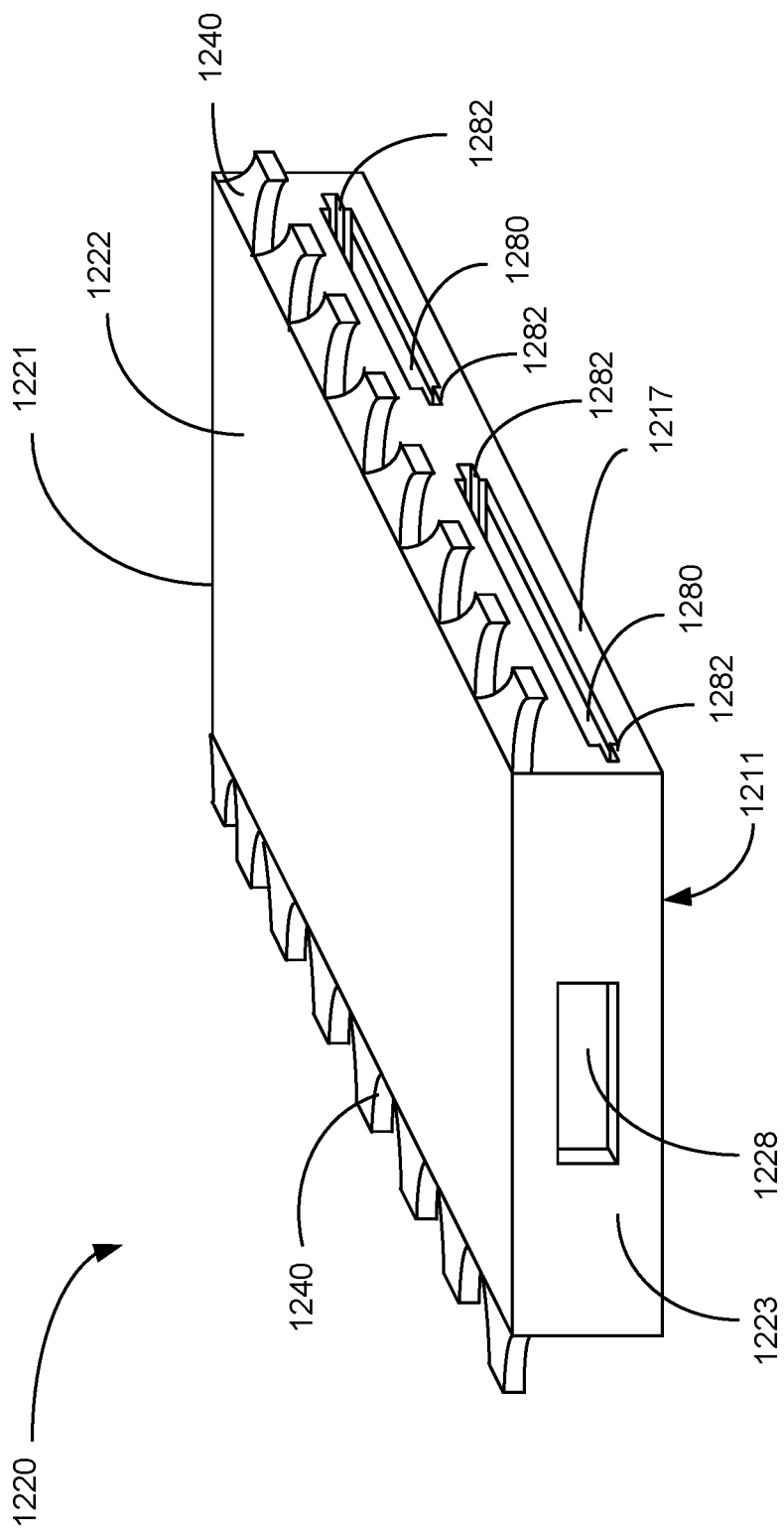
FIG. 12 is a top front perspective view of the lighting fixture of FIG. 11.
Figure 13:
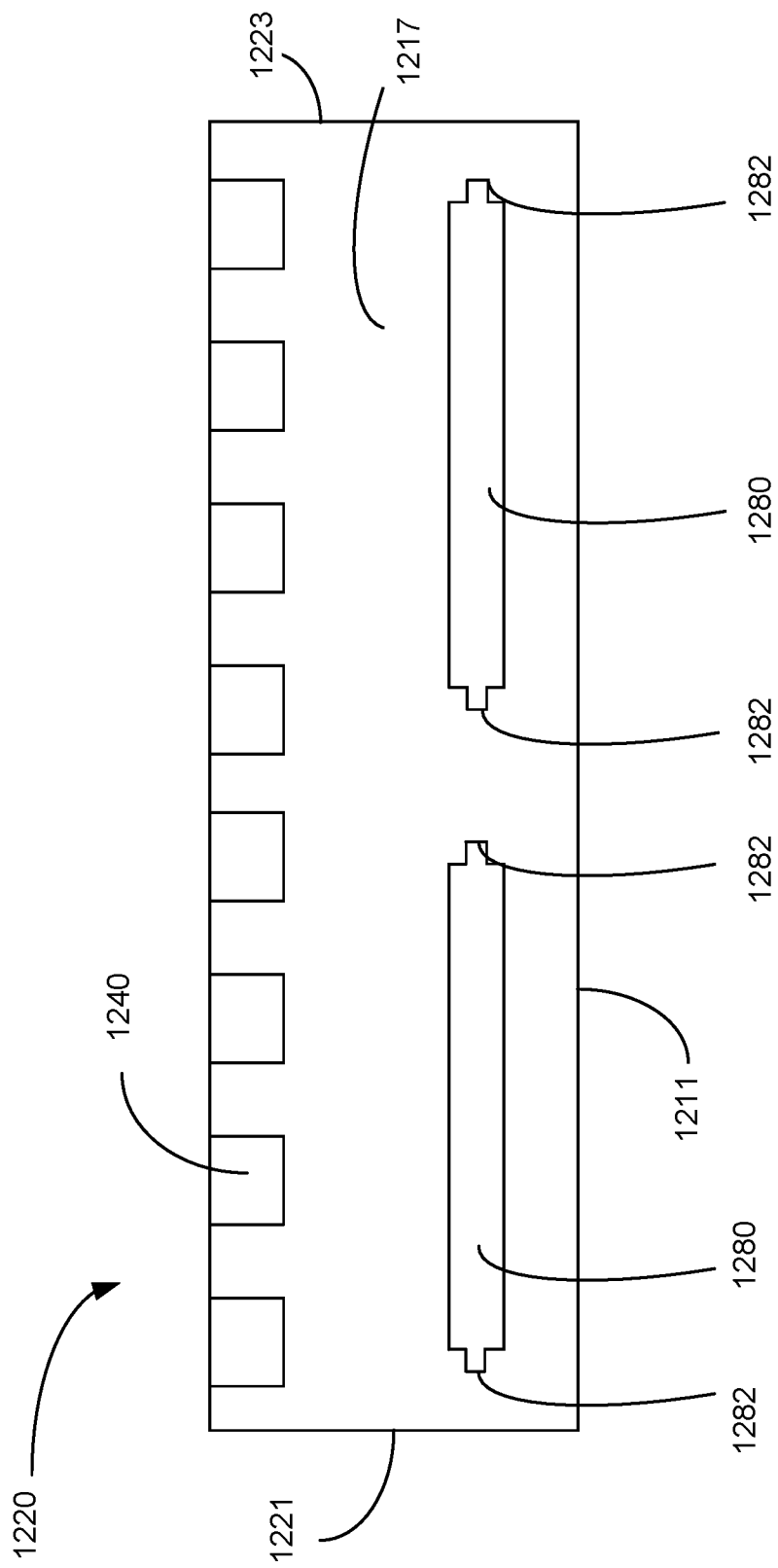
FIG. 13 is a side view of the lighting fixture of FIG. 11.
Figure 14:
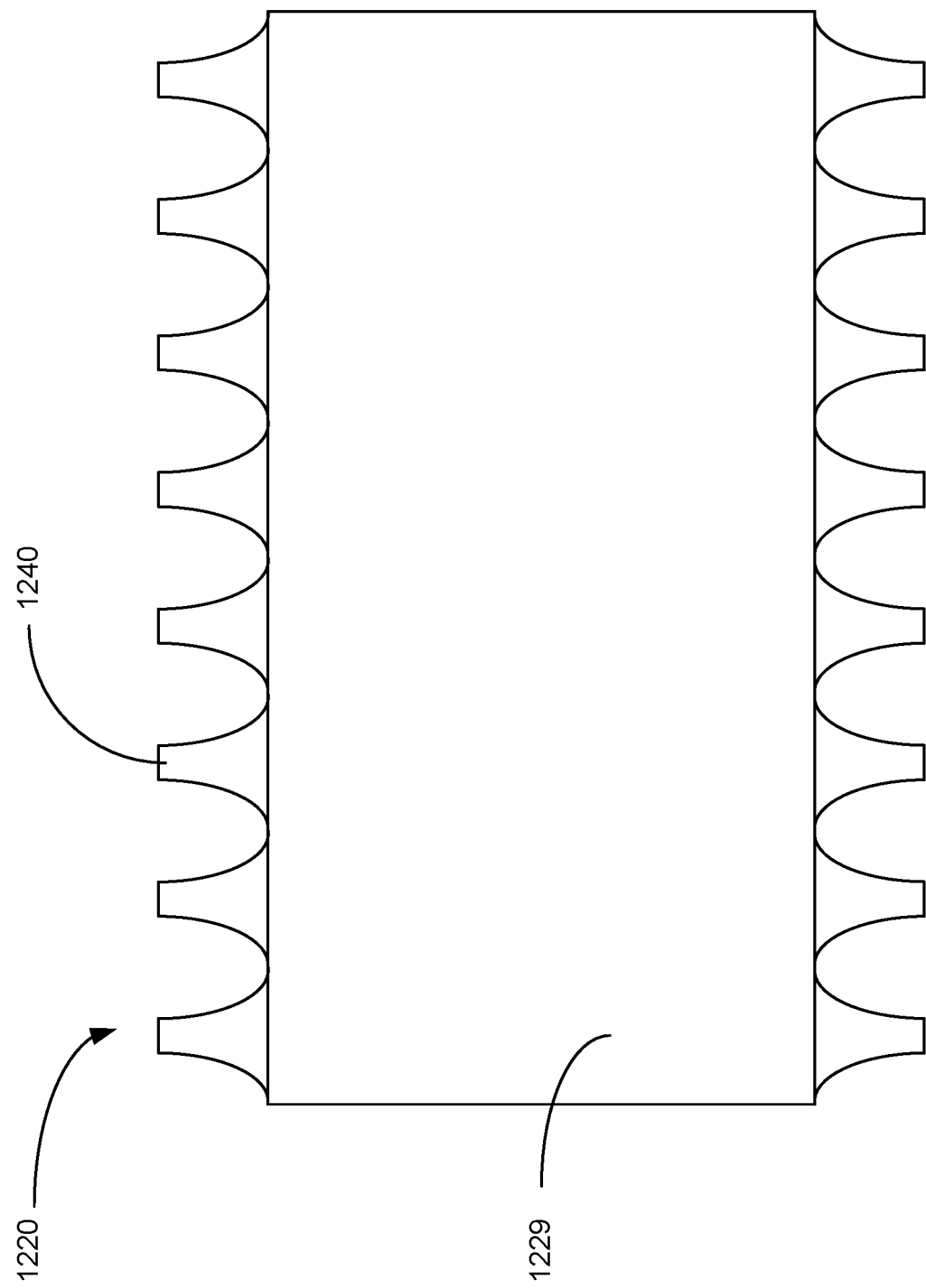
FIG. 14 is a top view of the lighting fixture of FIG. 11.

As shown in FIGS. 12 and 13, the light fixture 1220 includes a pair of light card mounting slots 1280 in the sidewall 1217 of the frame 1222. To mount the light cards within light fixture 1220, the light cards 1250 can be slid through the mounting slots 1280. This may allow the light cards 1250 to be replaced without removing a cover of the light fixture 1220. In some cases, this may also facilitate removing and/or replacing the light cards 1250 from the aisle outside the growing area 102, since it may only be necessary to access the side 1217 of the light fixture 1220. It will be appreciated that if slots 1280 are provided, they may be located at the elevation of lower compartment 233 and the cooling fins may be located on the sidewall of upper compartment 237.

In the example shown, the mounting slots 1280 include support tracks 1282. The support tracks 1282 may extend substantially the entire width of the light card mounting region. The first and second ends 1251 and 1253 of the light cards can be supported by the tracks 1282. A user can insert the light card 1250 into the mounting slot with the first and second ends 1251 and 1253 received by respective tracks 1282. The light card 1250 can then be slid into position within the fixture 1220.

The light card 1250 may include a power connector that automatically engages the corresponding fixture connector 1230 as the light card 1250 is slid into place. For instance, the central track may include a recess into which the light card connector can nest as the light card 1250 slides into the light card region. This may facilitate connecting the light card 1250 to power wiring coupled through conduit 1226 without needing direct access to the connectors. This may further facilitate removing and/or replacing the light cards 1250 from the aisle outside the growing area 102, since it is only necessary to access the side 1217 of the light fixture 1220.

In some embodiments, the fixture 1220 may include a cover for the light card slots 1280. For example, watertight covers may be used to ensure that the light cards 1250 and the internal fixture wiring are not exposed to water (moisture/humidity) from the growing area 102. The cover may be similar to a cover used on the light emitting face 211 of the fixture 220.

Power Supply Unit for a Lighting System

In some embodiments, it may be desirable to simplify maintenance and/or replacement of the power supply units. In embodiments described herein, the power supply unit may be a modular unit that provides connection outlets for incoming power connections from a mains power supply and outgoing power connections to the lighting units. The incoming and/or outgoing power connections may each be connected and disconnected without re-wiring the lighting system or incoming power supply for the cultivation facility. This may reduce the time and cost associated with replacing the power supply unit. This may also enable the power supply units to be replaced without requiring an electrician to perform the replacement operation.

It may also be desirable to ensure that maintenance of the lighting system and/or power supply units can be performed safely. In embodiments described herein, the power supply unit can include automatic shut-off switches to ensure that the lighting system does not have live power during maintenance operations. In some embodiments, the power supply units may include automatic shut-off switches that are activated when the power supply unit is accessed and/or when power connections to the power supply unit are disconnected and/or when the outgoing power connection is disconnected from a light fixture. Alternately, or in addition, in some embodiments, the power supply units may include automatic shut-off switches that are activated when the lighting units are activated, for example in response to the removal of a lighting unit cover.

The features in this section may be used by itself in any system or facility (e.g., an indoor cultivation facility) or in any combination or sub-combination with any other feature or features described herein.

Figure 17A:
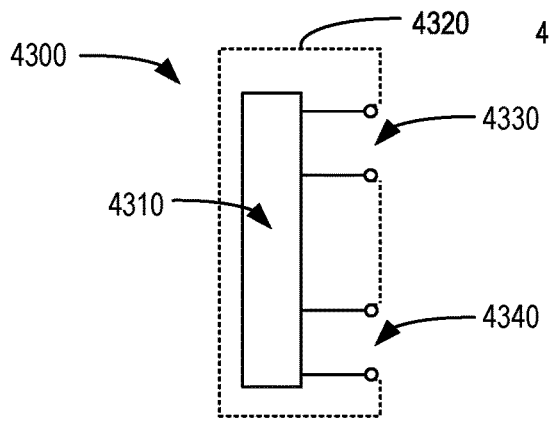
FIG. 17A is a schematic illustration of an example power supply unit in accordance with an embodiment.
Figure 17B:
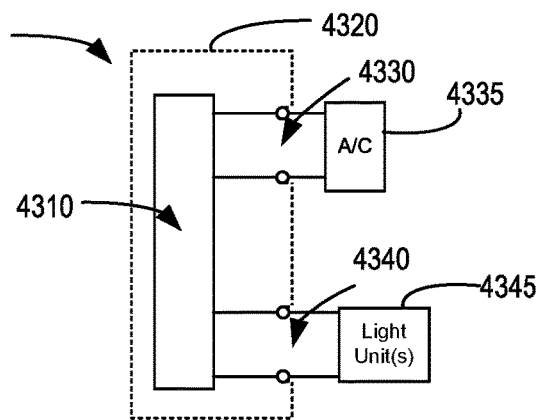
FIG. 17B is a schematic illustration of the power supply unit of FIG. 17A coupled to a power source and a lighting unit in accordance with an embodiment.

Referring to FIGS. 17A and 17B, shown therein is an example of a power supply unit 4300. Power supply unit 4300 is an example of a power supply unit that may be used in the various lighting systems and indoor cultivation systems described herein, such as lighting systems 200, 2200 and 3200 described herein above. In general, the power supply unit 4300 can provide electrical power to lighting elements used by lighting systems 200, 2200 and 3200 to illuminate plants 104 being cultivated.

The power supply unit can include an electrical power input 4330 and an electrical power output 4340. The electrical power input 4330 can be connected to a stationary power supply 4335, such as mains power. The electrical power input 4330 can be configured to receive AC power from the stationary power supply 4335.

The electrical power input 4330 can be configured to receive high level of powers from the stationary power supply 4335. Accordingly, the control and power distribution circuitry 4310 may include a high voltage circuit section connected to the electrical power input 4330. The high voltage circuit section can be configured to operate at the high voltage levels at which the power is received.

The electrical power output 4340 can be connected to the lighting system 4345. For example, the electrical power output 4340 may include separate electrical connections to each of the lighting units in the lighting system 4345 (as shown in FIG. 15) or a single output that connects to a bus as discussed previously. The electrical power output 4340 can provide power to the lighting units in lighting system 4345.

The control circuitry 4310 can also include voltage conditioning circuitry. The voltage conditioning circuitry can be configured to convert the high voltage power received at the electrical power input 4330 to a lower voltage that is usable by the lighting system.

The control circuitry 4310 can also include various power controls for the lighting system 4345. The control circuitry 4310 may be configured to activate and deactivate the lighting units in lighting system 4345. For example, the control circuitry 4310 may activate and/or deactivate the lighting units in response to user input from a control panel and/or a motion sensor. In some embodiments, the control circuitry 4310 may be configured to adjust the intensity of light emitted by the lighting units in lighting system 4345.

In some cases, the control circuitry 4310 may include a wireless communication module. The wireless communication module may allow a user to access and control the control circuitry 4310 wirelessly (e.g. using a mobile application on a smartphone or tablet). The wireless communication module may also allow the control circuitry 4310 to output feedback data, e.g. indicating the state of the power supply unit 4300 and/or the lighting system 4345.

In some embodiments, the control circuitry 4310 may be configured to operate the lighting units in the lighting system 4345 on a regular pattern of activation and deactivation. The illumination pattern used may depend, e.g., on the plants being grown. However, the illumination pattern may include cyclic periods of activation and deactivation (e.g. 16 hours of active illumination followed by 8 hours of the lighting system being inactive).

In some embodiments, the control circuitry 4310 may be configured to activate and/or deactivate individual light fixtures (or adjust the intensity of the individual fixtures). This may provide the lighting system 4345 to provide more granular control of the lighting across the growing area 102. This may be particularly useful if plants 104 are growing at different rates within the growing area 102.

In some embodiments, the power output 4340 can also include one or more signal connections between the power supply unit 4300 and the lighting units in system 4345. For example, the lighting units and/or individual lighting fixtures may include microcontrollers and/or sensor units. The signal connections included in the power output 4340 may allow the control circuitry 4310 to communicate with the controllers and/or sensors to provide commands and/or receive feedback data.

The power input port 4330 and power output port 4340 can be configured as quick connect connectors (e.g., a male electrical connector receivable in a female electrical connector). This may allow a user to easily connect and disconnect the power supply unit 4300.

For example, the lighting system 4345 and power supply 4335 may have power connectors mounted within the facility 100. The power supply unit 4300 can then be mounted to the power connectors in order to operate the lighting system 4345. This may allow the power supply unit 4300 to be easily repaired and/or replaced without requiring extensive re-wiring of the facility 100.

In some embodiments, the power supply unit 4300 is mounted concurrently (i.e. substantially simultaneously) to the power connectors of both the lighting system 4345 and power supply 4335. This may ensure that the power output 4340 of the power supply unit 4300 is connected whenever the high voltage power supply 4335 is connected to power supply unit 4300.

Alternatively, the power supply unit 4300 may be individually connected to the power supply 4335 and the lighting system 4345. In some cases, the power supply unit 4300 may be individually and separately mounted to each lighting unit within the lighting system 4345. This may facilitate maintenance of smaller portions of the power supply unit 4300.

Typically, however, the power supply unit 4300 provides connectors that allow the power supply unit 4300 to be easily connected to both the power supply input 4335 and the lighting system 4345 without requiring any re-wiring.

Figure 17C:
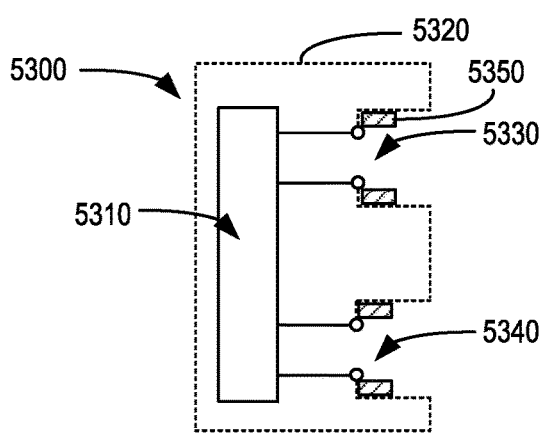
FIG. 17C is a schematic illustration of the example power supply unit of FIG. 17A including seal members in accordance with an embodiment.
Figure 17D:
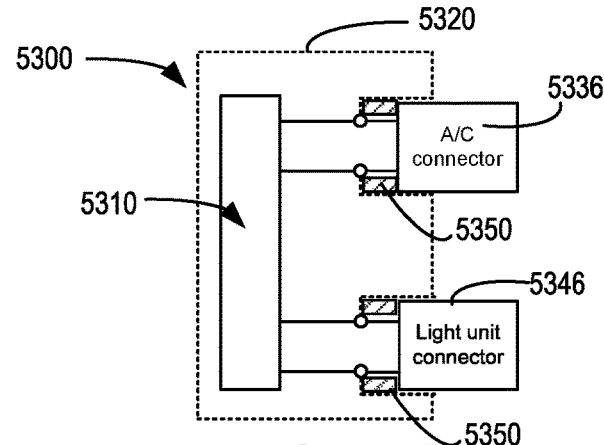
FIG. 17D is a schematic illustration of the power supply unit of FIG. 17C coupled to a power source and a lighting unit in accordance with an embodiment.

Referring now to FIGS. 17C and 17D, shown therein is an example of a power supply unit 5300. Power supply unit 5300 is another example of a power supply unit that may be used in the various lighting systems and indoor cultivation systems described herein, such as lighting systems 200, 2200 and 3200 described herein above. In general, the power supply unit 5300 can provide electrical power to lighting elements used by lighting systems 200, 2200 and 3200 to illuminate plants 104 being cultivated.

Power supply unit 5300 is generally similar to power supply unit 4300. Power supply unit 5300 includes a controller 5310, housing 5320, electrical input 5330, and electrical output 5340 that are generally similar to controller 4310, housing 4320, electrical input 4330, and electrical output 4340. However, power supply unit 5300 is further configured to maintain a watertight seal when connected to the mains power and lighting system.

The housing 5320 of power supply unit 5300 can provide an essentially watertight enclosure for the controller 5310. The housing 5320 may be substantially watertight apart from the electrical input 5330, and electrical output 5340. Accordingly, power supply unit 5300 can also include seal members 5350 positioned within the electrical input 5330 and electrical output 5340.

When the connector 5336 for the stationary power supply is engaged with the electrical input 5330, the seal member 5350 can define a watertight seal therebetween. Similarly, when the connector 5346 for the lighting system is engaged with the electrical output 5340, the seal member 5350 can define a watertight seal therebetween. This may ensure that power supply unit 5300 remains watertight in operation (e.g. compliant with various regulations, such as IP65-IP67). This may be particularly important in an indoor cultivation facility, as the environment may be humid and/or may involve water being sprayed or otherwise applied to plants 104.

The seal members 5350 may be compressible when the connectors 5336 and 5346 are connected to the power supply unit 5300. For example, the seal members 5350 may be provided as compressible O-rings around the electrical input 5330 and the electrical output 5340.

Figure 17E:
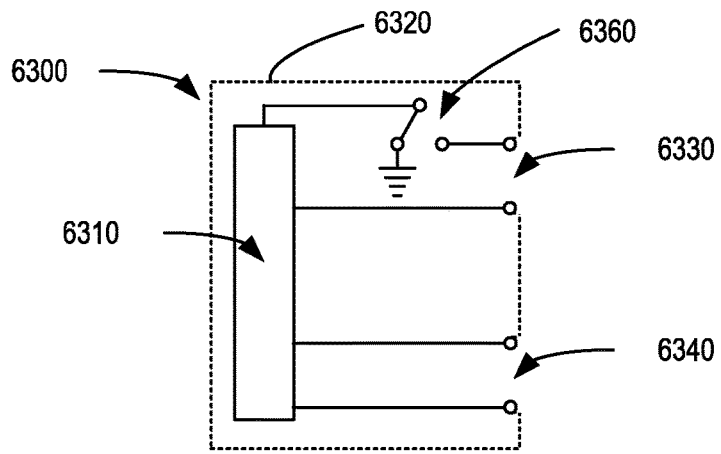
FIG. 17E is a schematic illustration of an example power supply unit in accordance with an embodiment.

Referring now to FIG. 17E, shown therein is an example of a power supply unit 6300. Power supply unit 6300 is another example of a power supply unit that may be used in the various lighting systems and indoor cultivation systems described herein, such as lighting systems 200, 2200 and 3200 described herein above. In general, the power supply unit 6300 can provide electrical power to lighting elements used by lighting systems 200, 2200 and 3200 to illuminate plants 104 being cultivated.

Power supply unit 6300 is generally similar to power supply units 4300 and 5300. Power supply unit 6300 includes a controller 6310, housing 6320, electrical input 6330, and electrical output 6340 that are generally similar to controller 4310, housing 4320, electrical input 4330, and electrical output 4340. However, the power supply unit 6300 also includes a deactivation switch 6360 that is operable to disconnect the high voltage power being received at the power input 6330.

The deactivation switch 6360 (which may also be referred to as a power activation switch) can be adjusted between an active position and an inactive position. In the active position, when the power supply unit 6300 is connected to an external power supply, the power supply unit 6300 provides live power. In the inactive position, power from the external power supply is disconnected from the power supply unit 6300. This may allow a user to perform repairs and/or maintenance on the power supply unit 6300 and/or lighting system 6340 in the absence of live power. As shown in FIG. 17E, the deactivation switch 6360 has already been moved to the inactive position.

In some embodiments, the deactivation switch 6360 may be manually actuated by a user. For example, the power supply unit 6300 may include an external shut-off switch or lever mounted on housing 6320. A user may actuate the deactivation switch 6360 prior to performing maintenance on the power supply unit 6300.

In some embodiments, the actuator for the deactivation switch 6360 can be integrated with an access door on the housing 6320. For example, the actuator may be drivingly engaged with a lock member of the access door. The lock member may be movable between a locked position in which the access door is locked and an unlocked position in which the access door is openable. The lock member may be adjusted using any sort of lock actuator, such as a rotatable knob.

Adjusting the lock member may drive the switch actuator which in turn can cause the switch 6360 to switch. For example, when the lock member is moved to the unlocked position, the actuator may be driven to cause switch 6360 to move to the deactivated position. This may prevent a user from accessing the power supply unit 6300 until live power has been disconnected.

In some embodiments, the switch 6360 may be actuated in response to a user attempting accessing one of the light fixtures and/or light cards in the light system. For example, the lightings units may include an outer cover enclosing the light emitting elements. The cover may be a plastic cover, such as an IP65, IP66, and/or IP67 compliant cover. Removal of the outer cover may actuate switch to move to the deactivated position. This may ensure that live power is not being provided to the light fixture and/or card when a user is attempting to access the light fixture and/or card (e.g. for replacement in the example of light fixture 220).

In some embodiments, the lighting system may include one or more light card access switches. For example, each light card may have an associated light card access switch. A user may actuate the light card access switch in order to remove and/or replace a light card. Each light card access switch can be coupled to the power supply unit 6300 so that power can be disconnected (e.g. by operation of switch 6360) prior to a user accessing the corresponding light card.

In some embodiments, a light card access switch may be coupled to the control unit 6310. The control unit 6310 may operate to disconnect power from only the corresponding light card (or light fixture) when the light card access switch is operated. This may allow the remaining fixtures to continue illuminating the plants 104 while the user is able to replace a light card in the absence of live power to that fixture.

Although the example embodiments of lighting systems, lighting fixtures, light cards, power supply units and so forth have been described above in the context of indoor cultivation facilities, it should be understood that the various embodiments described herein may also be implemented to provide lighting for other facilities, such as underground parking facilities for example. Various example embodiments described herein may facilitate installation, maintenance, and/or repair of lighting systems for such other facilities. Embodiments described herein may also help reduce the power costs required to provide lighting for those facilities.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

I claim:

1. A modular lighting system comprising:
    (a) a power supply, the power supply has an electrical power input that is connectable to a stationary power supply and an electrical power output; and,
    (b) a first plurality of lighting fixtures comprising a first lighting fixture and a second lighting fixture, each lighting fixture comprising at least one LED, wherein each lighting fixture is powered by the electrical power output of the power supply,
    wherein each of the first plurality of lighting fixtures is releasably connectable in electrical communication with the electrical power output without requiring an electrician;
    wherein the electrical power output is connected to a bus;
    wherein each of the first plurality of lighting fixtures is directly electrically connected to the bus; and
    wherein a portion of the bus extending between the electrical power output and the second lighting fixture is provided by the first lighting fixture, the portion extending to a first end of the second lighting fixture.

2. The lighting system of claim 1 wherein the power supply receives AC power from a stationary power supply.

3. The lighting system of claim 2 wherein the stationary power supply comprises a mains power.

4. The lighting system of claim 1 wherein the electrical power output includes separate electrical connections to each of the first plurality of lighting fixtures.

5. The lighting system of claim 1 wherein the first plurality of lighting fixtures are arrayed in a linear arrangement whereby the first plurality of lighting fixtures are mechanically connected end to end in sequence.

6. The lighting system of claim 1 wherein a first lighting fixture of the first plurality of lighting fixtures is physically connected to the power supply and a second lighting fixture of the first plurality of lighting fixtures is physically connected to the first lighting fixture.

7. The lighting system of claim 6 wherein the first lighting fixture includes wiring that connects to the power supply and to the second lighting fixture.

8. The lighting system of claim 7 wherein the power supply includes a bus and the wiring is releasably connectable to the bus without requiring an electrician.

9. The lighting system of claim 7 wherein the second lighting fixture is mechanically connected to the first lighting fixture.

10. The lighting system of claim 1 wherein the first lighting fixture has a first mating electrical connector and the second lighting fixture has a second mating electrical connector, and the first mating electrical connector is releasably connectable to the second mating electrical connector without requiring an electrician whereby when the first mating electrical connector is connected to the second mating electrical connector the second lighting fixture is electrically connected to the power supply via the bus.

11. The lighting system of claim 9 wherein a third lighting fixture is mechanically connected to the second lighting fixture and the second lighting fixture and the third lighting fixture have mating electrical connectors that are releasably connectable to each other without the requiring an electrician.

12. The lighting system of claim 9 wherein the power supply includes a bus and a third lighting fixture is mechanically connected to the second lighting fixture and the second lighting fixture and the bus have mating electrical connectors that are releasably connectable to each other without requiring an electrician.

13. The lighting system of claim 1 wherein the electrical power output is connected to a bus and the lighting system comprises a second plurality of lighting fixtures, each lighting fixture comprising at least one LED, wherein each lighting fixture of the second plurality of lighting fixtures is powered by the electrical power output of the power supply, the first plurality of lighting fixtures are arrayed in a linear arrangement and the second plurality of lighting fixtures are arrayed in a linear arrangement.

14. The lighting system of claim 13 wherein a first lighting fixture of the first plurality of lighting fixtures is physically connected to the power supply and a first lighting fixture of the second plurality of lighting fixtures is physically connected to the power supply.

15. The lighting system of claim 14 wherein a second lighting fixture of the first plurality of lighting fixtures is physically connected to the first lighting fixture of the first plurality of lighting fixtures and a second lighting fixture of the second plurality of lighting fixtures is physically connected to the first lighting fixture of the second plurality of lighting fixtures.

16. The lighting system of claim 15 wherein the first lighting fixture of the first plurality of lighting fixtures and the power supply have mating electrical connectors that are releasably connectable to each other without requiring an electrician and the first lighting fixture of the second plurality of lighting fixtures and the power supply have mating electrical connectors that are releasably connectable to each other without requiring an electrician.

17. The lighting system of claim 16 wherein the power supply comprises a bus that is releasably electrically connectable to each of the first lighting fixture of the first plurality of lighting fixtures and the first lighting fixture of the second plurality of lighting fixtures.

18. The lighting system of claim 1, wherein each lighting fixture includes a plurality of individually replaceable light emitting units.

19. The lighting system of claim 1, wherein each lighting fixture includes a plurality of individually replaceable light emitting units.

\* \* \* \* \*